United States Patent
Dai

(10) Patent No.: US 12,526,457 B2
(45) Date of Patent: Jan. 13, 2026

(54) ENCODING METHOD, DECODING METHOD, BITSTREAM, ENCODER, DECODER, SYSTEM AND STORAGE MEDIUM

(71) Applicant: GUANGDONG OPPO MOBILE TELECOMMUNICATIONS CORP., LTD., Dongguan (CN)

(72) Inventor: Zhenyu Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 118 days.

(21) Appl. No.: 18/529,318

(22) Filed: Dec. 5, 2023

(65) Prior Publication Data
US 2024/0107073 A1   Mar. 28, 2024

Related U.S. Application Data

(63) Continuation of application No. PCT/CN2021/099813, filed on Jun. 11, 2021.

(51) Int. Cl.
*H04N 19/70* (2014.01)
*H04N 19/117* (2014.01)
*H04N 19/82* (2014.01)

(52) U.S. Cl.
CPC .............. *H04N 19/70* (2014.11); *H04N 19/82* (2014.11)

(58) Field of Classification Search
None
See application file for complete search history.

(56) References Cited

U.S. PATENT DOCUMENTS 10,999,606 B2   5/2021   Yin
2022/0337853 A1*  10/2022   Li ................... H04N 19/1883

FOREIGN PATENT DOCUMENTS

CN   108184129 A   6/2018
CN   108520505 A   9/2018
(Continued)

OTHER PUBLICATIONS

International Search Report in the international application No. PCT/CN2021/099813, mailed on Mar. 9, 2022. 5 pages with English translation.
(Continued)

*Primary Examiner* — Christopher Braniff
(74) *Attorney, Agent, or Firm* — BAYES PLLC

(57) ABSTRACT

A decoding method includes: parsing bitstream to determine value of first syntax element identification information; determining, when the identification information indicates that preset selection network model is enabled to be used to perform model decision for current block, at least two output values according to preset selection network model. The at least two output values include first value corresponding to each candidate in-loop filter network model when in-loop filter network model is used for current block, and second value when in-loop filter network model is not used; determining, according to output values, target in-loop filter network model when in-loop filter network model is used for current block, or determining according to output values that in-loop filter network model is not used; and filtering, when in-loop filter network model is used for current block, current block using target in-loop filter network model, to obtain first reconstructed picture block of current block.

20 Claims, 21 Drawing Sheets

(56) References Cited

FOREIGN PATENT DOCUMENTS

| CN | 110351568 A | 10/2019 |
|---|---|---|
| CN | 111901592 A | 11/2020 |
| WO | 2021006624 A1 | 1/2021 |

OTHER PUBLICATIONS

Written Opinion of the International Search Authority in the international application No. PCT/CN2021/099813, mailed on Mar. 9, 2022. 6 pages with English translation.
Joint Video Experts Team (JVET) of ITU-T SG 16 WP 3 and ISO/IEC JTC 1/SC 29/WG 11, 13th Meeting: Marrakesh, Jan. 2019 Document: JVET-M0566, Title: AHG9: Adaptive convolutional neural network loop filter, Status: Input document to JVET, Purpose: Proposal, Author(s) or Contact(s): Hujun Yin, Rongzhen Yang, Xiaoran Fang, Shoujiang Ma, Yue Yu, Source: Intel Corporation. pp. 1-7. 9 pages.
Supplementary European Search Report in the European application No. 21944637.4, mailed on Mar. 26, 2025. 12 pages.

\* cited by examiner ous schemes at present,
most of these schemes select a model with better performance by calculating a rate-distortion cost of each model,
which is highly complex. Moreover, for the selected model,
whether to enable the model switch and whether to signal
enable/disable information (such as picture-level enable/
disable information and block-level enable/disable information) further need to be determined through the rate-distortion cost, thus causing additional bit overheads.

SUMMARY

Embodiments of the present disclosure relates to the field
of picture processing technologies, and particularly to an
encoding method, a decoding method, a bitstream, an
encoder, a decoder, a system and a storage medium.

Embodiments of the present disclosure provide an encoding method, a decoding method, a bitstream, an encoder, a
decoder, a system and a storage medium, which can not only
reduce the complexity, but also avoid additional bit overheads, thereby improving a coding performance, and then
improving encoding and decoding efficiency.

The technical solutions of the embodiments of the present
disclosure can be implemented as follows.

In a first aspect, an embodiment of the present disclosure
provides a decoding method, which is applied to a decoder.
The method includes the following operations. A bitstream
is parsed to determine a value of first syntax element
identification information. When the first syntax element
identification information indicates that a preset selection
network model is enabled to be used to perform a model
decision for a current block, at least two output values are
determined according to the preset selection network model
of the current block. The at least two output values include
a first value corresponding to each of at least one candidate
in-loop filter network model when an in-loop filter network
model is used for the current block, and a second value when
the in-loop filter network model is not used for the current
block. A target in-loop filter network model is determined
according to the at least two output values when the in-loop
filter network model is used for the current block, or it is
determined according to the at least two output values that
the in-loop filter network model is not used for the current
block. When the in-loop filter network model is used for the
current block, the current block is filtered by using the target
in-loop filter network model, to obtain a first reconstructed
picture block of the current block.

In a second aspect, an embodiment of the present disclosure provides an encoding method, which is applied to an
encoder. The method includes the following operations. A
value of first syntax element identification information is
determined. When the first syntax element identification
information indicates that a preset selection network model
is enabled to be used to perform a model decision for a
current block, at least two output values are determined
according to the preset selection network model of the
current block. The at least two output values include a first
value corresponding to each of at least one candidate in-loop
filter network model when an in-loop filter network model is
used for the current block, and a second value when the
in-loop filter network model is not used for the current
block. A target in-loop filter network model is determined
according to the at least two output values when the in-loop
filter network model is used for the current block, or it is
determined according to the at least two output values that
the in-loop filter network model is not used for the current
block. When the in-loop filter network model is used for the
current block, the current block is filtered by using the target
in-loop filter network model, to obtain a first reconstructed
picture block of the current block.

In a third aspect, an embodiment of the present disclosure
provides a decoder, including: a processor; and a memory
for storing computer-executable instructions. The processor
is configured to invoke and run the computer-executable
instructions stored in the memory, to perform operations of:
parsing a bitstream to determine a value of first syntax
element identification information; determining, when the
first syntax element identification information indicates that
a preset selection network model is enabled to be used to
perform a model decision for a current block, at least two
output values according to the preset selection network
model of the current block, where the at least two output
values comprise a first value corresponding to each of at
least one candidate in-loop filter network model when an
in-loop filter network model is used for the current block,
and a second value when the in-loop filter network model is
not used for the current block; determining, according to the
at least two output values, a target in-loop filter network
model when the in-loop filter network model is used for the
current block, or determining according to the at least two
output values that the in-loop filter network model is not
used for the current block; and filtering, when the in-loop
filter network model is used for the current block, the current
block using the target in-loop filter network model, to obtain
a first reconstructed picture block of the current block.

DETAILED DESCRIPTION

In order to provide a more detailed understanding of the features and technical content of the embodiments of the present disclosure, the implementation of the embodiments of the present disclosure will be described in detail below in conjunction with the accompanying drawings, which are provided for illustration only, and are not intended to limit the embodiments of the present disclosure.

Unless otherwise defined, all technologies and scientific terms used herein have a same meaning as would normally be understood by those skilled in the art of the present disclosure. The terms used herein are only for a purpose of describing the embodiments of the present disclosure and are not intended to limit the present disclosure.

In the following description, reference is made to "some embodiments", which describe a subset of all possible embodiments. However, it should be understood that "some embodiments" may be a same subset or different subsets of all the possible embodiments and may be combined with each other without conflict. It should further be noted that related terms "first/second/third" in the embodiments of the present disclosure are used only to distinguish similar objects rather than representing a particular order for objects. It should be understood that "first/second/third" may be interchanged in a particular order or a priority order, so that the embodiments of the present disclosure described herein can be implemented in an order other than that illustrated or described herein.

Prior to further detailed description of the embodiments of the present disclosure, related nouns and terms in the embodiments of the present disclosure will be explained, and the related nouns and terms in abbreviation in the embodiments of the present disclosure are applicable for the following interpretation.

Joint Video Experts Team (JVET)
New Generation Video Coding Standard H.266/Versatile Video Coding (VVC)
VVC Test Model (VTM)
Audio Video coding Standard (AVS)
High-Performance Model (HPM) of AVS
High Performance-Modular Artificial Intelligence Model (HPM-ModAI) of AVS
Convolutional Neural Network based in-Loop Filter (CNNLF)
DeBlocking Filter (DBF)
Sample Adaptive Offset (SAO)
Adaptive Loop Filter (ALF)
Quantization Parameter (QP)
Coding Unit (CU)
Coding Tree Unit (CTU)

It should be understood that digital video compression technologies are mainly to compress huge digital video data for transmission and storage. With a rapid increase of Internet videos and an increasing demand for video definition, although existing digital video compression standards can save a lot of video data, it is still necessary to pursue better digital video compression technologies to reduce pressure in terms of bandwidth and traffic for transmitting the digital video.

Figure 1:
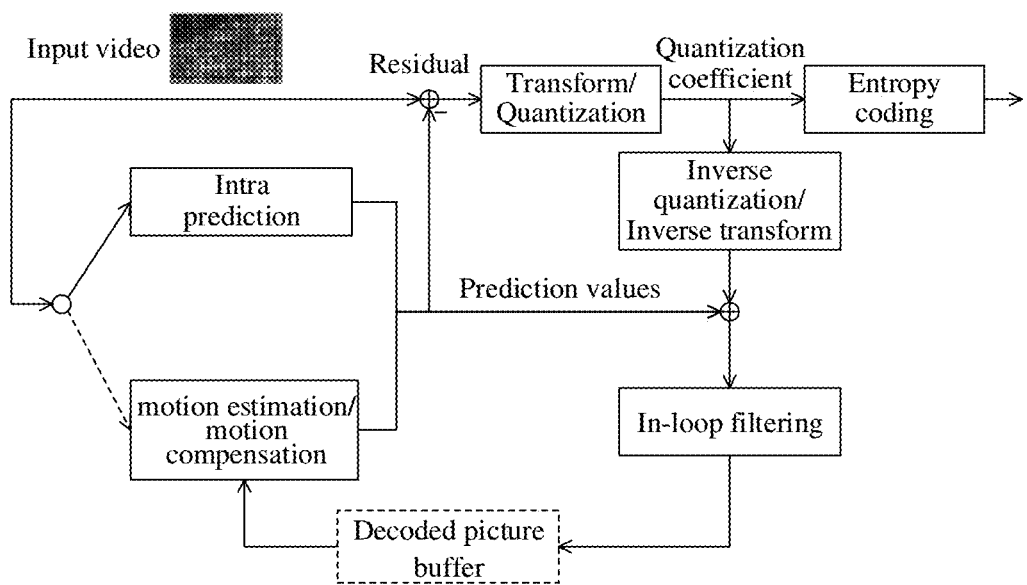
FIG. 1 is an application schematic diagram of an encoding
framework provided by an embodiment of the present
disclosure.

During a digital video encoding process, an encoder reads unequal samples, including a luma component and a chroma component, from original video sequences with different colour formats. That is to say, the encoder reads a black-and-white picture or a colour picture. Then, the picture is divided into blocks, and the block data is encoded by the encoder. Nowadays, the encoder is usually in a hybrid picture coding framework that generally includes intra prediction/inter prediction, transform/quantization, inverse quantization/inverse transform, in-loop filtering, entropy coding and other operations. For details of the processing flow, reference can be made to FIG. 1. Herein, for the intra prediction, sample information in current divided blocks is predicted only with reference to information of a same picture, so as to eliminate the spatial redundancy. The inter prediction may include motion estimation and motion compensation, and it can be performed with reference to picture information of different pictures. For the inter prediction, the motion estimation is used to search for motion vector information that best matches the current divided blocks, so as to eliminate the temporal redundancy. Through the transform, the predicted picture blocks are converted into a frequency domain, so that energy is redistributed, and information that is insensitive for human eyes can be removed through the transform in combination with the quantization, so as to eliminate the visual redundancy. The entropy coding can be used to eliminate the character redundancy according to current context model and probability information of a binary bitstream. The in-loop filtering is mainly used to process samples processed through the inverse transform and the inverse quantization, so as to compensate distortion information and provide a better reference for subsequent sample encoding.

Figure 2:
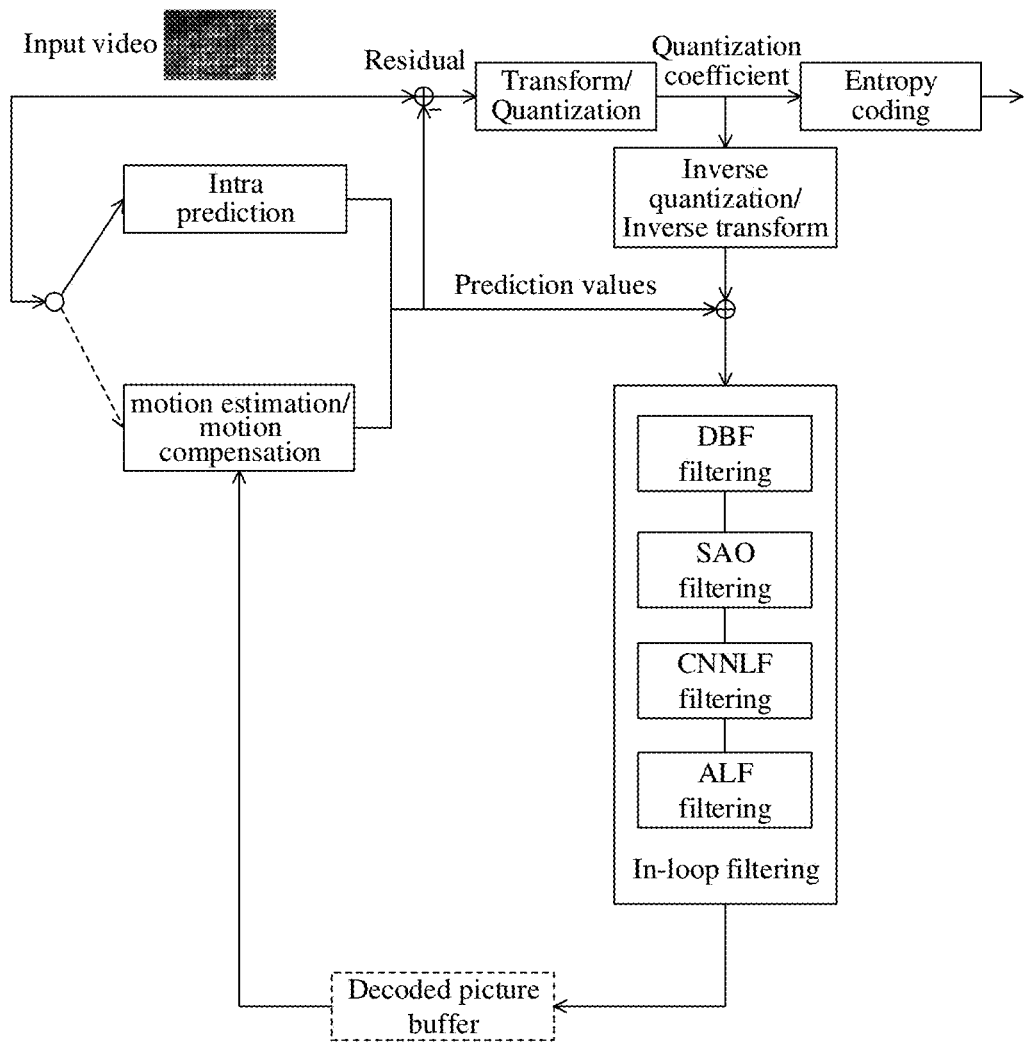
FIG. 2 is an application schematic diagram of another
encoding framework provided by an embodiment of the
present disclosure.

As far as video coding standards are concerned, for an in-loop filter, a traditional in-loop filter module mainly includes a DeBlocking Filter (hereinafter referred to as DBF), a Sample Adaptive Offset (hereinafter referred to as SAO) filter and an Adaptive Loop Filter (hereinafter referred to as ALF). In an application of an HPM-ModAI, a Convolutional Neural Network based in-Loop Filter (hereinafter referred to as CNNLF) is further adopted as a baseline scheme of an intelligent in-loop filter module, and the CNNLF is set between the SAO filter and the ALF, as shown in FIG. 2 in details. During a coding test, according to intelligent coding general test conditions, in an all intra configuration, the ALF is enabled, and the DBF and the SAO filter are disabled; in random access and low delay configurations, the DBF for Intra picture (I picture) is enabled, the ALF is enabled and the SAO filter is disabled.

In practical applications, especially in the HPM-ModAI, 16 candidate CNNLF models, including 4 I-picture luma component models, 4 non-Intra-picture (non-I-picture) luma component models, 4 chroma U-component models and 4 chroma V-component models, are respectively trained in 4 intervals divided according to ranges of QP 27-31, 32-37, 38-44 and 45-50. When encoding, according to different picture types, QPs, colour component types and other characteristics, it is necessary to artificially select a corresponding CNNLF model among these candidate CNNLF models. For example, it is possible to decide whether to invoke the CNNLF model through the rate-distortion cost, and signal enable/disable information such as picture-level enable/disable information and CTU-level enable/disable information. For configurations such as random access and low delay, the QP of each picture will fluctuate compared with an initial QP, causing that a selected CNNLF model may not actually be a model with best filtering effect to the picture.

That is to say, the existing neural network in-loop filter technologies usually train multiple candidate models according to picture types, QPs, colour component types and other characteristics. When encoding is performed, either a model is artificially selected and enable/disable information such as picture-level enable/disable information and CTU-level enable/disable information is encoded into a bitstream, or a model is selected through the rate-distortion cost and enable/disable information (such as picture-level enable/disable information and CTU-level enable/disable information) and a model index serial number are signalled. A model adaptive selection technology solution based on deep learning can be proposed, and the model adaptive selection technology solution can optimize model selection operations of a neural network in-loop filter, but for the selected model, it is still necessary to decide whether to enable the model switch through the rate-distortion cost, and signal the picture-level and CTU-level enable/disable information, resulting in additional bit overheads.

An embodiment of the present disclosure provides an encoding method, at an encoder side, a value of first syntax element identification information is determined; when the first syntax element identification information indicates that a preset selection network model is enabled to be used to perform a model decision for a current block, at least two output values are determined according to the preset selection network model of the current block; the at least two output values include a first value corresponding to each of at least one candidate in-loop filter network model when an in-loop filter network model is used for the current block, and a second value when the in-loop filter network model is not used for the current block; a target in-loop filter network model is determined according to the at least two output values when the in-loop filter network model is used for the current block, or it is determined according to the at least two output values that the in-loop filter network model is not used for the current block; and when the in-loop filter network model is used for the current block, the current block is filtered by using the target in-loop filter network model, to obtain a first reconstructed picture block of the current block.

An embodiment of the present disclosure provides a decoding method, at a decoder side, a bitstream is parsed to determine a value of first syntax element identification information; when the first syntax element identification information indicates that a preset selection network model is enabled to be used to perform a model decision for a current block, at least two output values are determined according to the preset selection network model of the current block; where the at least two output values include a first value corresponding to each of at least one candidate in-loop filter network model when an in-loop filter network model is used for the current block, and a second value when the in-loop filter network model is not used for the current block; a target in-loop filter network model is determined according to the at least two output values when the in-loop filter network model is used for the current block, or it is determined according to the at least two output values that the in-loop filter network model is not used for the current block; and when the in-loop filter network model is used for the current block, the current block is filtered by using the target in-loop filter network model, to obtain a first reconstructed picture block of the current block.

In such a manner, by introducing a neural network technology based on deep learning to perform adaptive decision on the in-loop filter network model, a target in-loop filter network model when the in-loop filter network model is used for the current block is determined or it is determined that the in-loop filter network model is not used for the current block; when the in-loop filter network model is used for the current block, the target in-loop filter network model can further be used to filter the current block, so that not only the complexity can be reduced, but also additional bit overheads can be avoided, thereby the coding performance can be improved, and then the encoding and decoding efficiency can be improved. In addition, a first reconstructed picture block finally outputted can be more closer to an original picture block, so that video picture quality can be improved.

The embodiments of the present disclosure will be described in detail below with reference to the accompanying drawings.

Figure 3A:
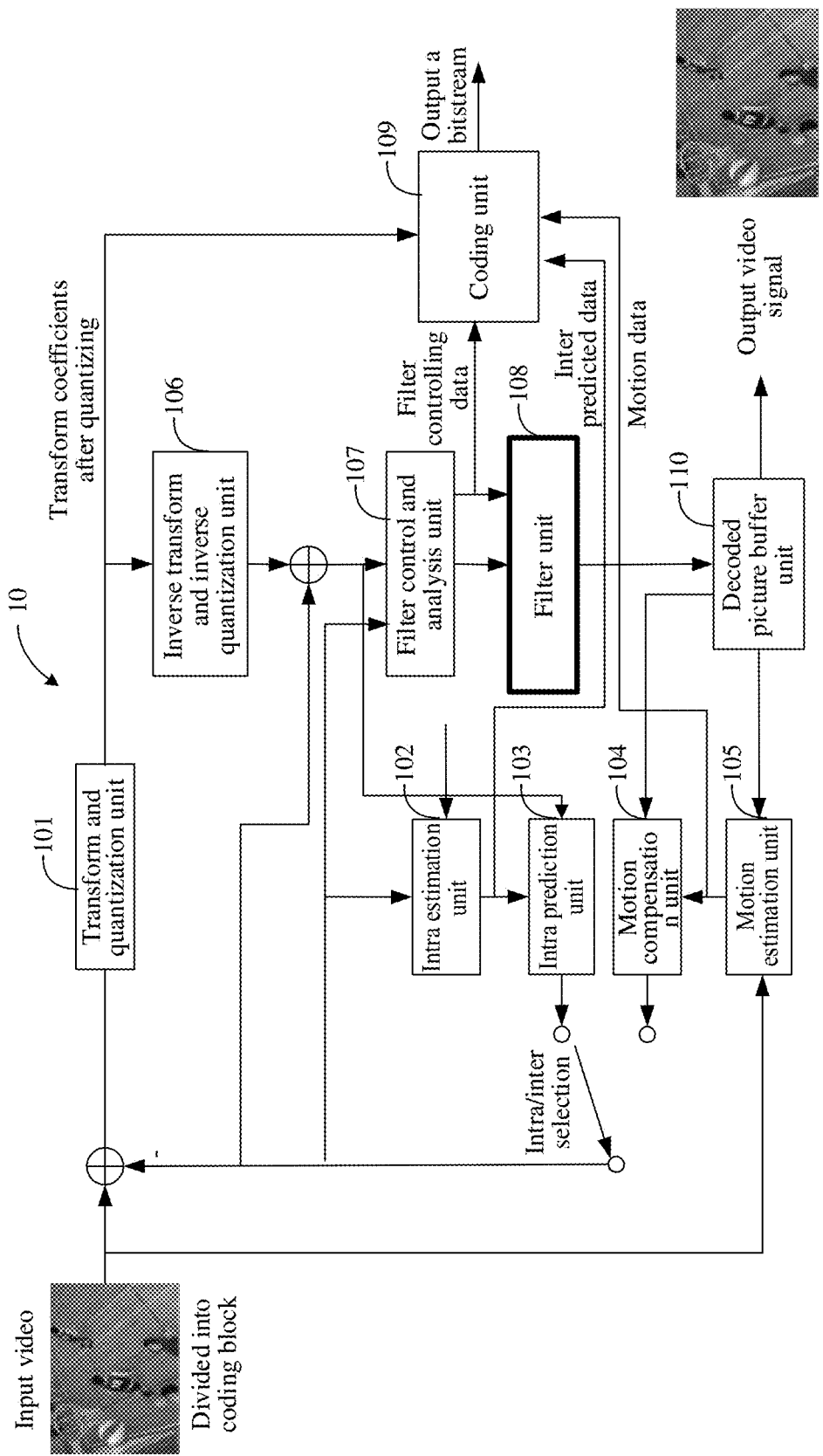
FIG. 3A is a detailed framework schematic diagram of a
video encoding system provided by an embodiment of the
present disclosure.

Referring to FIG. 3A, a detailed framework schematic diagram of a video encoding system provided by an embodiment of the present disclosure is illustrated. As shown in FIG. 3A, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filter unit 108, a coding unit 109 and a decoded picture buffer unit 110, etc. The filter unit 108 can implement DBF filtering/SAO filtering/ALF filtering, and the coding unit 109 can implement header information coding and Context-based Adaptive Binary Arithmetic Coding (CABAC). For an input original video signal, a video encoding block can be obtained by dividing into Coding Tree Units (CTUs), and then the video encoding block is transformed by the transform and quantization unit 101 based on residual sample information obtained after intra prediction or inter prediction, including transforming the residual information from a sample domain to a transform domain, and obtained transform coefficients are quantized to further reduce the bit rate. The intra estimation unit 102 and the intra prediction unit 103 are used to perform the intra prediction on the video encoding block. Specifically, the intra estimation unit 102 and the intra prediction unit 103 are used to determine an intra prediction mode to be used to encode the video encoding block. The motion compensation unit 104 and the motion estimation unit 105 are used to perform the inter prediction coding on the received video encoding block with respect to one or more blocks of one or more reference pictures to provide temporal prediction information. A motion estimation performed by the motion estimation unit 105 is a process of generating motion vectors that can be used to estimate the motion of the video encoding block, and then a motion compensation is performed by the motion compensation unit 104 based on the motion vectors determined by the motion estimation unit 105. After the intra prediction mode is determined, the intra prediction unit 103 is further used to supply selected intra prediction data to the coding unit 109, and the motion estimation unit 105 transmits the motion vector data determined by calculating to the coding unit 109. Furthermore, the inverse transform and inverse quantization unit 106 is used for reconstruction of the video encoding block, and a residual block is reconstructed in the sample domain. Blocking artifacts of the reconstructed residual block are removed through the filter control and analysis unit 107 and the filter unit 108, and then the reconstructed residual block is added to a predictive block in a picture of the decoded picture buffer unit 110, so as to generate a reconstructed video encoding block. The coding unit 109 is used for encoding various encoding parameters and quantized transform coefficients. In a CABAC-based coding algorithm, context contents can be based on adjacent coding blocks, and can be used to code information indicating the determined intra prediction mode, so that a bitstream of the video signal is outputted. The decoded picture buffer unit 110 is used to store the reconstructed video encoding block for prediction reference. As the video picture encoding proceeds, new reconstructed video encoding blocks are continuously generated and all of these reconstructed video encoding blocks are stored in the decoded picture buffer unit 110.

Figure 3B:
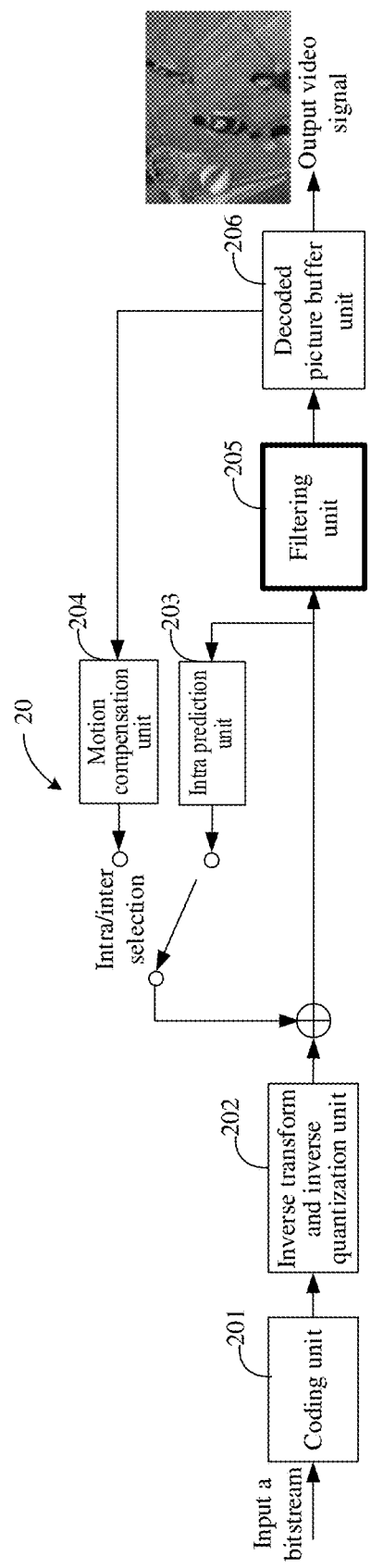
FIG. 3B is a detailed framework schematic diagram of a
video decoding system provided by an embodiment of the
present disclosure.

Referring to FIG. 3B, a detailed framework schematic diagram of a video decoding system provided by an embodiment of the present disclosure is illustrated. As shown in FIG. 3B, the video decoding system 20 includes a coding unit 201, an inverse transform and inverse quantization unit 202, an intra prediction unit 203, a motion compensation unit 204, a filtering unit 205 and a decoded picture buffer unit 206, etc. The coding unit 201 can implement a header information decoding and a CABAC decoding, and the filtering unit 205 can implement DBF filtering/SAO filtering/ALF filtering. After an input video signal is encoded as described in FIG. 3A, a bitstream of the video signal is outputted. The bitstream is inputted into the video decoding system 20, and firstly passes through the coding unit 201 to obtain decoded transform coefficients. The transform coefficients are processed by the inverse transform and inverse quantization unit 202 to generate a residual block in a sample domain. The intra prediction unit 203 can be used to generate prediction data of a current video decoding block based on the determined intra prediction mode and data from previously decoded block of a current picture. The motion compensation unit 204 is used to determine prediction information for the video decoding block by parsing motion vectors and other associated syntax elements, and use the prediction information to generate a predictive block of the video decoding block that is being decoded. The decoded video block is formed by summing the residual block from the inverse transform and inverse quantization unit 202 and the corresponding predictive block generated by the intra prediction unit 203 or the motion compensation unit 204. Blocking artifacts of the decoded video signal are removed through the filtering unit 205, so that the video quality can be improved. Then the decoded video block is stored in the decoded picture buffer unit 206. The decoded picture buffer unit 206 stores a reference picture for subsequent intra prediction or motion compensation, at the same time, the decoded picture buffer unit 206 is also used to output the video signal, i.e. a recovered original video signal is obtained.

It should be noted that the methods provided by the embodiments of the present disclosure can be applied to the filtering unit 108 (represented by bold black box) as shown in FIG. 3A or the filtering unit 205 (represented by bold black box) as shown in FIG. 3B. That is to say, the methods in the embodiments of the present disclosure can be applied to a video encoding system (referred to as "encoder" for short), a video decoding system (referred to as "decoder" for short), or even to a video encoding system and a video decoding system at the same time, which is not limited herein.

It should further be noted that when the embodiments of the present disclosure are applied to the encoder, "current block" specifically refers to a block currently to be encoded in the video picture (which can also be referred to as "encoding block" for short). When the embodiments of the present disclosure are applied to the decoder, "current block" specifically refers to a block currently to be decoded in the video picture (which can also be referred to as "decoding block" for short).

Figure 4:
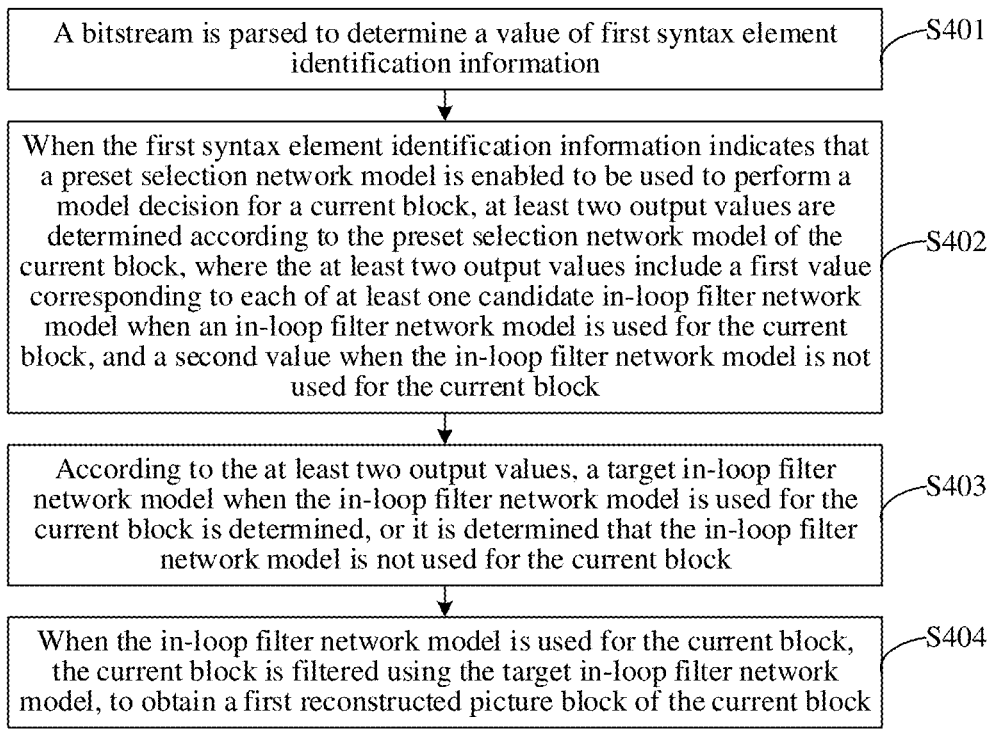
FIG. 4 is a schematic flowchart of a decoding method
provided by an embodiment of the present disclosure.

In an embodiment of the present disclosure, referring to FIG. 4, a schematic flowchart of a decoding method provided by the embodiment of the present disclosure is shown. As shown in FIG. 4, the method can include the following operations.

At S401, a bitstream is parsed to determine a value of first syntax element identification information.

It should be noted that a video picture can be divided into multiple picture blocks, and each picture block currently to be decoded can be referred to as a decoding block. Herein, each decoding block may include a first picture component, a second picture component, and a third picture component. The current block is a decoding block for which in-loop filtering processing of the first picture component, the second picture component or the third picture component is currently to be performed in the video picture. The current block herein can be a CTU, a CU, or even a block smaller than the CU, which is not limited in the embodiment of the present disclosure.

Herein, with respect to the first picture component, the second picture component and the third picture component, in the embodiments of the present disclosure, they may be divided into two colour component types, i.e., a luma component and a chroma component, from a perspective of colour division. In such a case, if operations such as prediction of a luma component, inverse transform and inverse quantization and loop filtering are to be performed on the current block, the current block can also be referred to as a luma block. Alternatively, if operations such as prediction of a chroma component, inverse transform and inverse quantization and loop filtering are to be performed on the current block, the current block can also be referred to as a chroma block.

It should further be noted that, at the decoder side, an embodiment of the present disclosure specifically provides an in-loop filtering method, and particularly a deep learning based method for adaptive decision on using an in-loop filter network model, which is applied to the filtering unit 205 as shown in FIG. 3B. Herein, the filtering unit 205 may include a DBF, an SAO filter, a CNNLF and an ALF. For the filtering unit 205, a CNNLF model in the filtering unit 205 can be adaptively decided according to the method described in the embodiment of the present disclosure, so that a target model can be determined when the CNNLF model is used for the current block or it is determined that the CNNLF model is not used for the current block.

Figure 5:
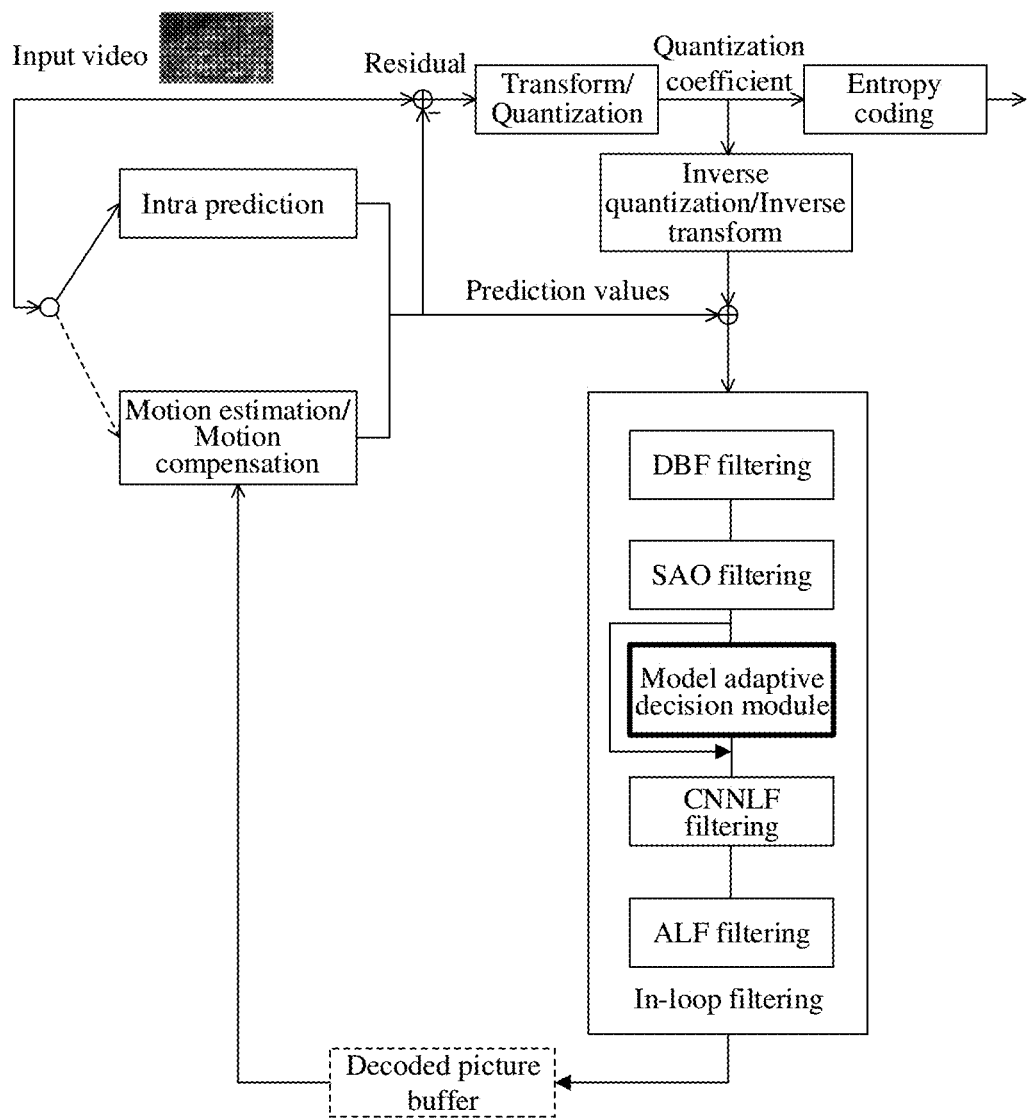
FIG. 5 is an application schematic diagram of yet another
encoding framework provided by an embodiment of the
present disclosure.

More specifically, an embodiment of the present disclosure provides a deep learning based model adaptive decision module, for performing a adaptive decision on whether an in-loop filter network model (such as the CNNLF model) is used or not, so as to improve coding performance. As shown in FIG. 5, the in-loop filter may further include a Model Adaptive Decision (MAD) module besides the DBF, the SAO filter, the CNNLF and the ALF, and the MAD module is located between the SAO filter and the CNNLF. In addition, using of the MAD module does not depend on flag bits of the DBF, the SAO filter, the CNNLF and the ALF, and the MAD module is merely placed before the CNNLF. It should be noted that the MAD module can be regarded as a preset selection network model composed of a multi-layer convolution neural network and a multi-layer fully connected neural network, so as to decide whether the CNNLF model is used for the current block or not. The decision can specifically be a target model determined when the CNNLF model is used for the current block, or a determination that the CNNLF model is not used for the current block.

Herein, in order to facilitate the decoder to determine whether a preset selection network model is enabled to be used to perform a model decision for a current block, first syntax element identification information can be set, and then the above determination can be performed according to a value of the first syntax element identification information obtained by decoding. In some embodiments, the method may further include the following operations.

In response to the value of the first syntax element identification information being a first identification value, it is determined that the first syntax element identification information indicates that the preset selection network model is enabled to be used to perform the model decision for the current block.

In response to the value of the first syntax element identification information being a second identification value, it is determined that the first syntax element identification information indicates that the preset selection network model is not enabled to be used to perform the model decision for the current block.

It should be noted that the first identification value and the second identification value are different values, and the first identification value and the second identification value can be in the form of parameters or numbers. Specifically, the first syntax element identification information may be a parameter written in a profile or a value of a flag, which is not limited in the embodiments of the present disclosure.

Taking the first syntax element identification information being a flag as an example, at this time, for the first identification value and the second identification value, the first identification value can be set to 1 and the second identification value can be set to 0. Alternatively, the first identification value can be set to true and the second identification value can be set to false. Alternatively, the first identification value can also be set to 0, and the second identification value can also be set to 1. Alternatively, the first identity value can be set to false and the second identity value can be set to true. For example, as to the flag, generally the first identification value can be 1 and the second identification value can be 0, which are not limited herein.

It should further be noted that the preset selection network model can be regarded as a neural network, and the first syntax element identification information can be regarded as an enable flag for a neural network based model adaptive decision, which can be represented by model_adaptive_decision_enable_flag here. Specifically, the model_adaptive_decision_enable_flag can be used to indicate whether a preset selection network model is enabled to be used to perform a model decision for a current block.

At S402, when the first syntax element identification information indicates that a preset selection network model is enabled to be used to perform a model decision for a current block, at least two output values are determined according to the preset selection network model of the current block. The at least two output values include a first value corresponding to each of at least one candidate in-loop filter network model when an in-loop filter network model is used for the current block, and a second value when the in-loop filter network model is not used for the current block.

It should be noted that if the preset selection network model is enabled to be used to perform the model decision for the current block, then the preset selection network model used for the current block can be determined from multiple candidate preset selection network models according to colour component types of the current block, quantization parameters of the current block and picture types of a picture to which the current block belongs, and then according to the preset selection network model, probability distribution conditions of at least one candidate in-loop filter network model when the in-loop filter network model is used for the current block and probability distribution conditions when the in-loop filter network model is not used for the current block can be determined. Specifically, in the embodiments of the present disclosure, the at least two output values include a first value corresponding to each of at least one candidate in-loop filter network model when the in-loop filter network model is used for the current block, and a second value when the in-loop filter network model is not used for the current block.

In a more specific example, the first value can be used to reflect the probability distribution conditions of the at least one candidate in-loop filter network model when the in-loop filter network model is used for the current block, and the second value can be used to reflect the probability distribution conditions when the in-loop filter network model is not used for the current block. In other words, both the first value and the second value can be expressed as probability values. That is, the at least two output values determined according to the preset selection network model can be at least two probability values. Alternatively, the first value and the second value can also be used to reflect weight distribution conditions of the at least one candidate in-loop filter network model when the in-loop filter network model is used for the current block and weight distribution conditions when the in-loop filter network model is not used for the current block. That is, the first value and the second value can also be referred to as the weight values, which are not limited in the embodiments of the present disclosure.

It should be understood that the preset selection network model herein is not the same for different colour component types. In the embodiments of the present disclosure, the preset selection network model corresponding to the luma component can be referred to as a luma selection network model, and the preset selection network model corresponding to the chroma component can be referred to as a chroma selection network model. Thus, in some embodiments, the determining the preset selection network model for the current block may include the following operations.

In response to the colour component type of the current block being the luma component (i.e., the current block is the luma block), a luma selection network model of the current block is determined.

Or, in response to the colour component type of the current block being the chroma component (i.e., the current block is the chroma block), a chroma selection network model of the current block is determined.

Accordingly, the candidate in-loop filter network models are different for different colour component types. In the embodiments of the present disclosure, one or more candidate in-loop filter network models corresponding to the luma component can be referred to as candidate luma in-loop filter network models, and one or more candidate in-loop filter network models corresponding to the chroma component can be referred to as candidate chroma in-loop filter network models. Thus, in some embodiments, the determining the at least two output values according to the preset selection network model of the current block may include the following operations.

In response to the colour component type of the current block being the luma component, at least two luma output values are determined according to the luma selection network model, where the at least two luma output values include a first value corresponding to each of at least one candidate luma in-loop filter network model when the luma in-loop filter network model is used for the current block, and a second value when the luma in-loop filter network model is not used for the current block.

Or, in response to the colour component type of the current block being the chroma component, at least two chroma output values are determined according to the chroma selection network model, where the at least two chroma output values include a first value corresponding to each of at least one candidate chroma in-loop filter network model when the chroma in-loop filter network model is used for the current block, and a second value when the chroma in-loop filter network model is not used for the current block.

That is to say, taking the probability value as an example, the colour component types may include a luma component and a chroma component. In the embodiments of the present disclosure, if the colour component type of the current block is the luma component, the luma selection network model of the current block needs to be determined, and then according to the luma selection network model, not only the probability distribution conditions when the luma in-loop filter network model is not used for the current block can be determined, but also the probability distribution conditions corresponding to each of at least one candidate luma in-loop filter network model when the luma in-loop filter network model is used for the current block can be determined. If the colour component type of the current block is a chroma component, the chroma selection network model of the current block needs to be determined, and then according to the chroma selection network model, not only the probability distribution conditions when the chroma in-loop filter network model is not used for the current block can be determined, but also the respective probability distribution conditions corresponding to each of at least one candidate chroma in-loop filter network model when the chroma in-loop filter network model is used for the current block can be determined.

Furthermore, the picture types can include I-picture, P-picture and B-picture. The I-picture, i.e., the Intra-coded Picture, represents a key picture, which can be understood as a complete preservation of this picture. The P-picture, i.e., the Predictive-coded Picture, represents differences between a picture and its previous key picture (I-picture). The B-picture, i.e., the Bidirectionally predicted Picture, is a bidirectional difference picture, that is, the B-picture records differences between a picture and both its previous and subsequent pictures.

In the embodiments of the present disclosure, the picture types may include a first type and a second type. The preset selection network models herein are also different for different picture types.

In a specific example, the first type may be an I-picture and the second type may be a non-I-picture. It should be noted that no specific limitations are made herein.

In a possible embodiment, for the luma selection network model, the luma selection network model corresponding to the first type can be referred to as a first luma selection network model, and the luma selection network model corresponding to the second type can be referred to as a second luma selection network model. Thus, in some embodiments, in a case where the colour component type of the current block is the luma component, the determining the luma selection network model of the current block may include the following operations.

In response to a picture type of a picture to which the current block belongs being the first type, a first luma selection network model of the current block is determined.

Or, in response to the picture type of the picture to which the current block belongs being the second type, a second luma selection network model of the current block is determined.

Accordingly, for the candidate luma in-loop filter network model, according to different picture types, the candidate luma in-loop filter network models are also different. Specifically, one or more candidate luma in-loop filter network models corresponding to the first type can be referred to as candidate first luma selection network models, and one or more candidate luma in-loop filter network models corresponding to the second type can be referred to as candidate second luma selection network models. Thus, in some embodiments, the determining the at least two luma output values according to the luma selection network model may include the following operations.

In response to the picture type of the picture to which the current block belongs being the first type, the at least two luma output values are determined according to the first luma selection network model, where the at least two luma output values include a first value corresponding to each of at least one candidate first luma in-loop filter network model when the first luma in-loop filter network model is used for the current block, and a second value when the first luma in-loop filter network model is not used for the current block.

Or, in response to the picture type of the picture to which the current block belongs being the second type, the at least two luma output values are determined according to the second luma selection network model, where the at least two luma output values include a first value corresponding to each of at least one candidate second luma in-loop filter network model when the second luma in-loop filter network model is used for the current block, and a second value when the second luma in-loop filter network model is not used for the current block.

Further, in the embodiments of the present disclosure, for the one or more candidate in-loop filter network models corresponding to the luma component (referred to as "candidate luma in-loop filter network models"), whether the at least one candidate first luma in-loop filter network model corresponding to the first type or the at least one candidate second luma in-loop filter network model corresponding to the second type, all these candidate in-loop filter network models are obtained through model training.

In some embodiments, the method may further include the following operations.

A first training set is determined. The first training set includes at least one first training sample and at least one second training sample, the picture type of the first training sample is the first type, the picture type of the second training sample is the second type, and both the first training sample and the second training sample are obtained according to at least one kind of quantization parameter.

A first neural network structure is trained using the luma component of the at least one first training sample, to obtain at least one candidate first luma in-loop filter network model.

The first neural network structure is trained using the luma component of the at least one second training sample, to obtain at least one candidate second luma in-loop filter network model.

Herein, the first neural network structure includes at least one of the following: a convolution layer, an activation layer, a residual module, and a skip connection layer.

That is to say, the at least one candidate first luma in-loop filter network model and the at least one candidate second luma in-loop filter network model are determined by training the first neural network structure based on the at least one training sample, and the at least one candidate first luma in-loop filter network model and the at least one candidate second luma in-loop filter network model have corresponding relationships with picture types, colour component types and quantization parameters.

In another possible embodiment, for the chroma selection network model, the chroma selection network model corresponding to the first type can be referred to as a first chroma selection network model, and the chroma selection network model corresponding to the second type can be referred to as a second chroma selection network model. Thus, in some embodiments, in a case where the colour component type of the current block is the chroma component, the determining the chroma selection network model of the current block may include the following operations.

In response to a picture type of a picture to which the current block belongs being the first type, a first chroma selection network model of the current block is determined.

Or, in response to the picture type of the picture to which the current block belongs being the second type, a second chroma selection network model of the current block is determined.

Accordingly, for the candidate chroma in-loop filter network model, according to different picture types, the candidate chroma in-loop filter network models are also different. Specifically, one or more candidate chroma in-loop filter network models corresponding to the first type can be referred to as candidate first chroma selection network models, and one or more candidate chroma in-loop filter network models corresponding to the second type can be referred to as candidate second chroma selection network models. Thus, in some embodiments, the determining the at least two chroma output values according to the chroma selection network model may include the following operations.

In response to the picture type of the picture to which the current block belongs being the first type, the at least two chroma output values are determined according to the first chroma selection network model, where the at least two chroma output values include a first value corresponding to each of at least one candidate first chroma in-loop filter network model when the first chroma in-loop filter network model is used for the current block, and a second value when the first chroma in-loop filter network model is not used for the current block.

Or, in response to the picture type of the picture to which the current block belongs being the second type, the at least two chroma output values are determined according to the second chroma selection network model, where the at least two chroma output values include a first value corresponding to each of at least one candidate second chroma in-loop filter network model when the second chroma in-loop filter network model is used for the current block, and a second value when the second chroma in-loop filter network model is not used for the current block.

Further, in the embodiments of the present disclosure, for the one or more candidate in-loop filter network models corresponding to the luma component (referred to as "candidate chroma in-loop filter network models"), whether the at least one candidate first chroma in-loop filter network model corresponding to the first type or the at least one candidate second chroma in-loop filter network model corresponding to the second type, all these candidate in-loop filter network models are obtained through model training.

In some embodiments, the method may further include the following operations.

A first training set is determined. The first training set includes at least one first training sample and at least one second training sample, the picture type of the first training sample is the first type, the picture type of the second training sample is the second type, and both the first training sample and the second training sample are obtained according to at least one kind of quantization parameter.

A second neural network structure is trained using the chroma component of the at least one first training sample, to obtain at least one candidate first chroma in-loop filter network model.

The second neural network structure is trained using the chroma component of the at least one second training sample, to obtain at least one candidate second chroma in-loop filter network model.

Herein, the second neural network structure includes at least one of the following: a convolution layer, an activation layer, a residual block, and a skip connection layer.

That is to say, the at least one candidate first chroma in-loop filter network model and the at least one candidate second chroma in-loop filter network model are determined by training the second neural network structure based on the at least one training sample, and the at least one candidate first chroma in-loop filter network model and the at least one candidate second chroma in-loop filter network model have corresponding relationships with picture types, colour components types and quantization parameters.

In a specific example, the first neural network structure may include a first convolution module, a first residual module, a second convolution module and a first connection module.

Figure 6A:
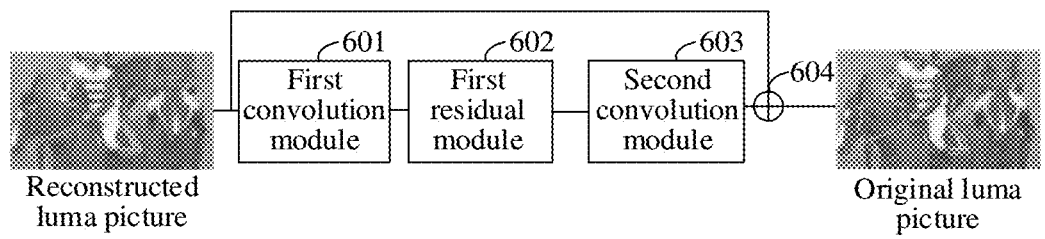
FIG. 6A is a schematic diagram of a network structure composition of a luma in-loop filter network model provided by an embodiment of the present disclosure.

Herein, as shown in FIG. 6A, an input of the first neural network structure is a reconstructed luma picture and an output thereof is an original luma picture. The first neural network structure includes a first convolution module 601, a first residual module 602, a second convolution module 603 and a first connection module 604. In FIG. 6A, the first convolution module 601, the first residual module 602, the second convolution module 603 and the first connection module 604 are sequentially connected, and the first connection module 604 is further connected to an input of the first convolution module 601.

In a more specific example, for the first neural network structure, the first convolution module is composed of one convolution layer and one activation layer, the second convolution module is composed of two convolution layers and one activation layer, the connection module is composed of a skip connection layer, the first residual module includes multiple residual blocks, and each residual block is composed of two convolution layers and one activation layer.

In another specific example, the second neural network structure includes an up-sampling module, a third convolution module, a fourth convolution module, a fusion module, a second residual module, a fifth convolution module and a second connection module.

Figure 6B:
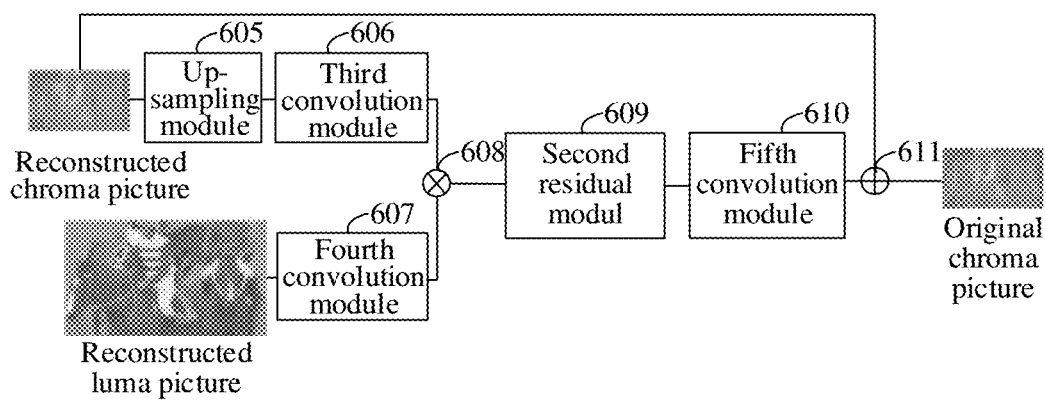
FIG. 6B is a schematic diagram of a network structure composition of a chroma in-loop filter network model provided by an embodiment of the present disclosure.

Herein, as shown in FIG. 6B, inputs of the second neural network structure are a reconstructed luma picture and a reconstructed chroma picture, and an output of the second neural network structure is original chroma picture. The second neural network structure includes an up-sampling module 605, a third convolution module 606, a fourth convolution module 607, a fusion module 608, a second residual module 609, a fifth convolution module 610 and a second connection module 611. In FIG. 6B, an input of the up-sampling module 605 is a reconstructed chroma picture, and the up-sampling module 605 is connected to the third convolution module 606. An input of the fourth convolution module 607 is the reconstructed luma picture, the third convolution module 606 and the fourth convolution module 607 are connected to the fusion module 608; and the fusion module 608, the second residual module 609, the fifth convolution module 610 and the second connection module 611 are sequentially connected, and the second connection module 611 is further connected to an input of the up-sampling module 605.

In a more specific example, for the second neural network structure, the third convolution module is composed of one convolution layer and one activation layer, the fourth convolution module is composed of one convolution layer and one activation layer, the fifth convolution module is composed of two convolution layers, one activation layer and one pooling layer, the connection module is composed of a skip connection layer, the second residual module includes multiple residual blocks, and each residual block is composed of two convolution layers and one activation layer.

Figure 7A:
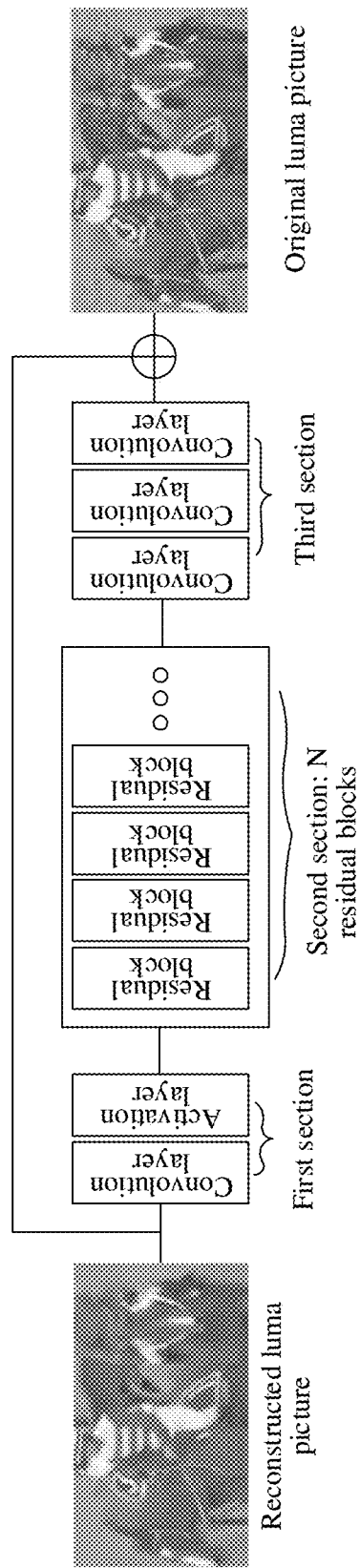
FIG. 7A is a schematic diagram of a network structure composition of another luma in-loop filter network model provided by an embodiment of the present disclosure.
Figure 7B:
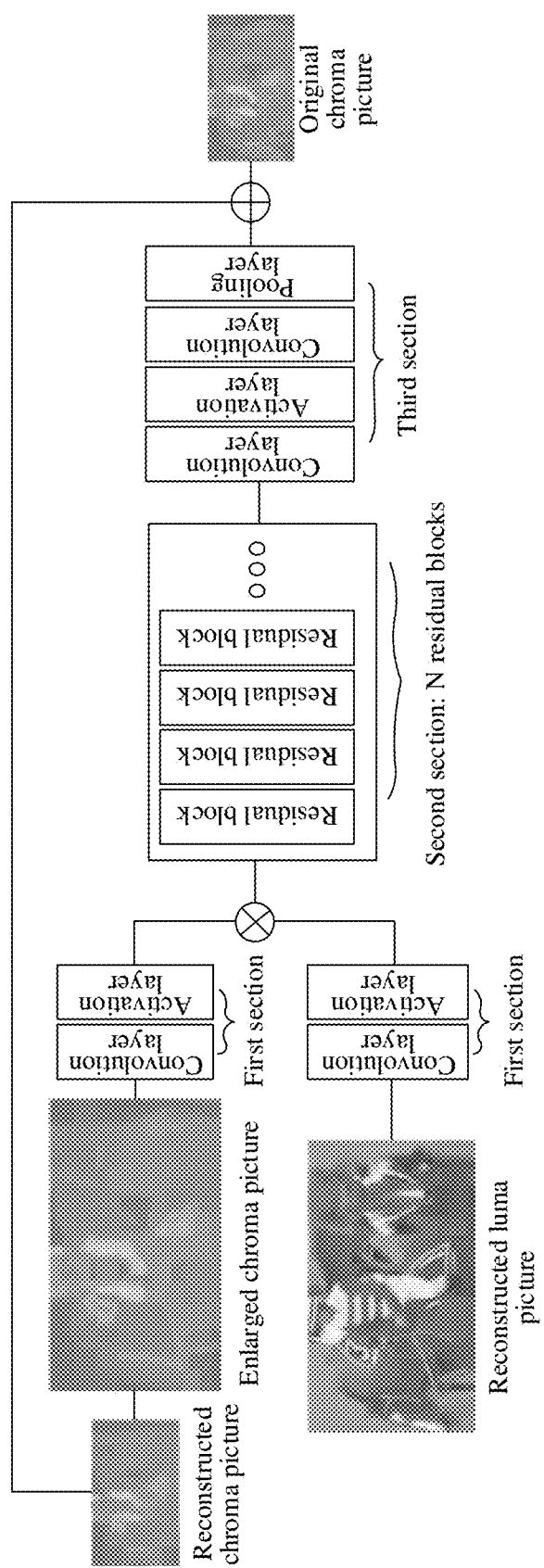
FIG. 7B is a schematic diagram of a network structure composition of another chroma in-loop filter network model provided by an embodiment of the present disclosure.

Exemplarily, taking the in-loop filter network model being the CNNLF as an example, different network structures for the luma component and the chroma component are designed for the CNNLF, respectively. As shown in FIG. 7A in details, a first neural network structure is designed for the luma component. As shown in FIG. 7B in details, a second neural network structure is designed for the chroma component.

Figure 8:
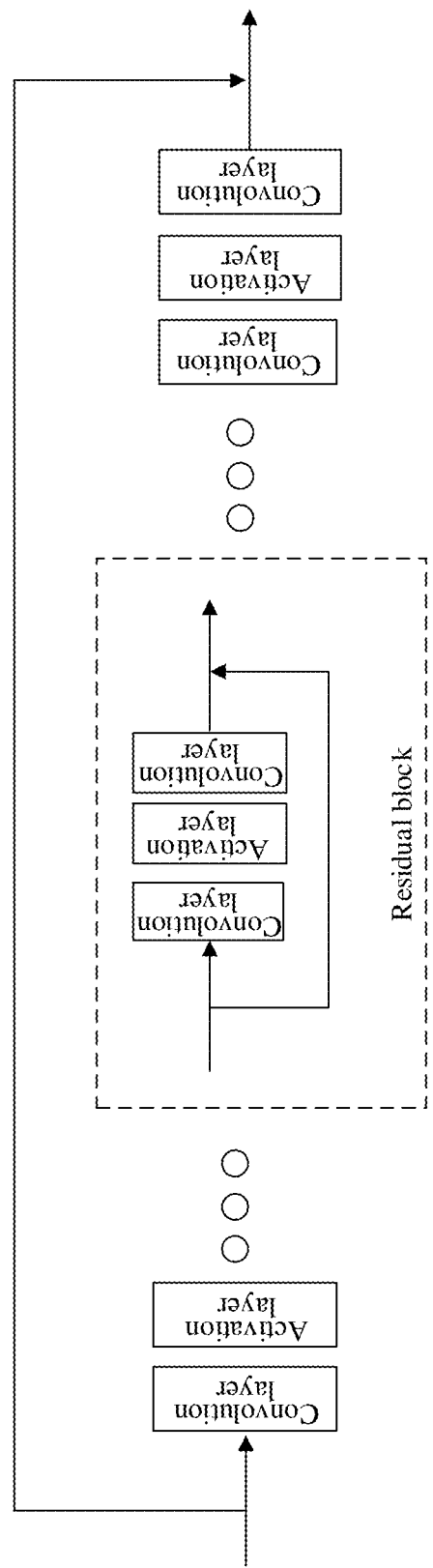
FIG. 8 is a schematic diagram of a network structure composition of a residual block provided by an embodiment of the present disclosure.

For the luma component, as shown in FIG. 7A, the whole network structure can include a convolution layer, an activation layer, a residual block, and a skip connection layer. Herein, the convolution kernel of the convolution layer can be 3×3, that is, it can be expressed by 3×3 Conv. The activation layer can be a linear activation function, that is, it can be expressed by a Rectified Linear Unit (ReLU), which can also be referred to as s linear rectification function. The ReLU is commonly used in artificial neural networks, which usually refers to nonlinear functions represented by ramp function and its variants. As shown in a dashed box in FIG. 8, the network structure of the residual block (ResBlock) can include a convolution layer (Conv), an activation layer (ReLU), and a skip connection layer (Concat). In the network structure, the skip connection layer refers to a global skip connection from an input to an output included in the network structure, which can enable the network focus on learning residuals and accelerate a convergence process of the network.

For the chroma component, as shown in FIG. 7B, the luma component is introduced as one of inputs to guide filtering of the chroma component. The whole network structure can include a convolution layer, an activation layer, a residual block, a pooling layer, and a skip connection layer. Because of the inconsistency in terms of resolution, the chroma component needs to be up-sampled at first. In order to avoid introducing other noises in the up-sampling process, the resolution can be enlarged by directly copying neighbouring samples, so as to obtain an enlarged chroma picture. In addition, at the end of the network structure, the pooling layer (such as an average pooling layer, represented by 2×2 AvgPool) is used to perform down-sampling of the chroma component. Specifically, in an application of the HPM-ModAI, a number of residual blocks of the luma component network may be set to N=20, and a number of residual blocks of the chroma component network may be set to N=10.

Thus, during the model training, 16 candidate in-loop filter network models, such as 4 I-picture luma component models, 4 non-I-picture luma component models, 4 chroma U-component models and 4 chroma V-component models, can be obtained through offline training.

It can further be understood that corresponding preset selection network models are different for different colour component types. Herein, the preset selection network model corresponding to the luma component can be referred to as a luma selection network model, and the preset selection network model corresponding to the chroma component can be referred to as a chroma selection network model.

In a possible embodiment, in a case where the colour component type of the current block is the luma component, the determining the luma selection network model of the current block may include the following operations.

At least one candidate luma selection network model is determined, where the candidate luma selection network model includes a candidate first luma in-loop filter network model and/or a candidate second luma in-loop filter network model.

The picture type of the picture to which the current block belongs and quantization parameters of the current block are determined.

In response to the picture type being the first type, at least one candidate first luma selection network model corresponding to the first type is determined from the at least one candidate luma selection network model, and the first luma selection network model of the current block is determined from the at least one candidate first luma selection network model according to the quantization parameters.

Or, in response to the picture type being the second type, at least one candidate second luma selection network model corresponding to the second type is determined from the at least one candidate luma selection network model, and the second luma selection network model of the current block is determined from the at least one candidate second luma selection network model according to the quantization parameters.

In another possible embodiment, in a case where the colour component type of the current block is the chroma component, the determining the chroma selection network model of the current block may include the following operations.

At least one candidate chroma selection network model is determined, where the candidate chroma selection network model includes a candidate first chroma in-loop filter network model and/or a candidate second chroma in-loop filter network model.

The picture type of the picture to which the current block belongs and quantization parameters of the current block are determined.

In response to the picture type being the first type, at least one candidate first chroma selection network model corresponding to the first type is determined from the at least one candidate chroma selection network model, and the first chroma selection network model of the current block is determined from the at least one candidate first chroma selection network model according to the quantization parameters.

Or, in response to the picture type being the second type, at least one candidate second chroma selection network model corresponding to the second type is determined from the at least one candidate chroma selection network model, and the second chroma selection network model of the current block is determined from the at least one candidate second chroma selection network model according to the quantization parameters.

It should be noted that the preset selection network model of the current block is not only related to the quantization parameters, but also related to the picture types and the colour component types. Different colour component types correspond to different preset selection network models. For example, for the luma component, the preset selection network model can be a luma selection network model related to the luma component; for the chroma component, the preset selection network model can be a chroma selection network model related to the chroma component. Moreover, different picture types correspond to different preset selection network models. For a luma selection network model related to the luma component, a luma selection network model corresponding to the first type can be referred to as the first luma selection network model, and a luma selection network model corresponding to the second type can be referred to as the second luma selection network model. For a chroma selection network model related to the chroma component, a chroma selection network model corresponding to the first type can be referred to as a first chroma selection network model, and a chroma selection network model corresponding to the second type can be referred to as the second chroma selection network model.

It should further be noted that in the embodiments of the present disclosure, at least one candidate luma selection network model (including the candidate first luma selection network model and/or the candidate second luma selection network model) and at least one candidate chroma selection network model (including the candidate first chroma selection network model and/or the candidate second chroma selection network model) can be trained in advance according to different quantization parameters, such as QP having values of 27-31, 32-37, 38-44, 45-50, and according to different picture types, such as the first type and the second type.

In such a manner, for the luma component, after the picture type of the current block is determined, and assuming that the picture type is an I-picture, at least one candidate I-picture luma selection network model corresponding to the I-picture type can be determined from the at least one candidate luma selection network model; and according to a quantization parameter of the current block, the I-picture luma selection network model corresponding to the quantization parameter (i.e., the luma selection network model of the current block) can be determined from the at least one candidate I-picture luma selection network model. Alternatively, assuming that the picture type is a non-I-picture, at least one candidate non-I-picture luma selection network model corresponding to the I-picture type can be determined from the at least one candidate luma selection network model; and according to a quantization parameter of the current block, the non-I-picture luma selection network model corresponding to the quantization parameter (i.e., the luma selection network model of the current block) can be determined from the at least one candidate non-I-picture luma selection network model. In addition, for the chroma component, the chroma selection network model is determined in a same manner as for the luma component, which will not be described in detail herein.

Further, with respect to the model training of the at least one candidate luma selection network model and the at least one candidate chroma selection network model, in some embodiments, the method may further include the following operations.

A second training set is determined. The second training set includes at least one training sample and the training sample is obtained according to at least one kind of quantization parameter.

A third neural network structure is trained using the luma component of the training sample in the second training set, to obtain at least one candidate luma selection network model.

The third neural network structure is trained using the chroma component of the training sample in the second training set, to obtain at least one candidate chroma selection network model.

That is to say, the at least one candidate luma selection network model is determined by training the third neural network structure based on the at least one training sample, and the at least one candidate luma selection network model has corresponding relationship with picture types, colour component types and quantization parameters. In addition, the at least one candidate chroma selection network model is also determined by training the third neural network structure based on the at least one training sample, and the at least one candidate chroma selection network model has corresponding relationship with picture types, colour component types and quantization parameters.

It should be noted that in the embodiments of the present disclosure, the third neural network structure may include at least one of the following: a convolution layer, a pooling layer, a fully connected layer and an activation layer.

In a specific example, the third neural network structure includes a sixth convolution module and a fully connected module sequentially connected.

In a more specific example, the sixth convolution module includes multiple convolution sub-modules, and the convolution sub-module is composed of one convolution layer and one pooling layer. The fully connected module includes multiple fully connected sub-modules, and the fully connected sub-module is composed of one fully connected layer and one activation layer.

That is to say, the preset selection network model can be composed of a multi-layer convolution neural network and a multi-layer fully connected layer neural network, and then the preset selection network model of the current block, such as the luma selection network model or the chroma selection network model, is obtained by performing deep learning using the training sample.

In the embodiments of the present disclosure, the deep learning is a kind of machine learning, and the machine learning is the only way to realize artificial intelligence. The concept of the deep learning originates from researches of an artificial neural network, and multilayer perceptron with multiple hidden layers is a kind of deep learning structure. The deep learning can form more abstract higher layer representation attribute categories or features by combining lower layer features, so as to discover a distributed feature representation of data. In the embodiments of the present disclosure, the Convolutional Neural Networks (CNN) is taken as an example, the CNN is a category of feedforward neural networks with a deep structure and containing convolution calculating, and it is a representative algorithm of the deep learning. The preset selection network model herein can be a convolution neural network structure.

Exemplarily, either the luma selection network model or the chroma selection network model can be seen as being obtained by training the third neural network structure. That is to say, for the preset selection network model, the embodiments of the present disclosure also designs the third neural network structure, specifically as shown in FIG. 9A and FIG. 9B.

Figure 9A:
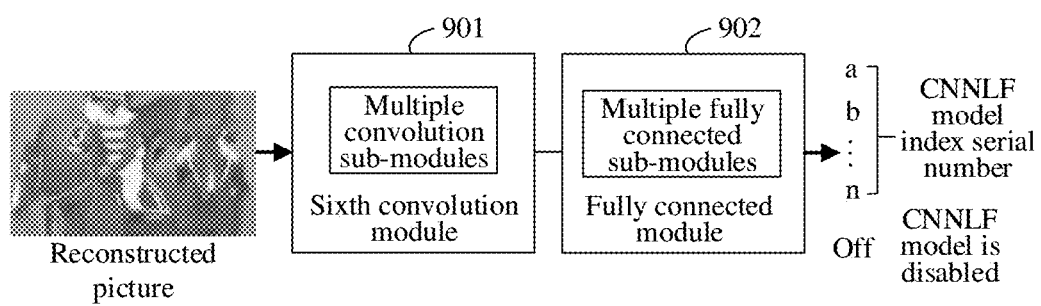
FIG. 9A is a schematic diagram of a network structure composition of a preset selection network model provided by an embodiment of the present disclosure.

As shown in FIG. 9A, an input of the third neural network structure is a reconstructed picture, and an output of the third neural network structure is probability distribution conditions of each of the at least one candidate in-loop filter network model when the in-loop filter network model is used for the current block and a case where the in-loop filter network model is not used for the current block. In FIG. 9A, the third neural network structure includes a sixth convolution module 901 and a fully connected module 902, and the sixth convolution module 901 and the fully connected module 902 are sequentially connected. The sixth convolution module 901 may include multiple convolution sub-modules, and each convolution sub-module may be composed of one convolution layer and one pooling layer. The fully connected module 902 may include multiple fully connected sub-modules, and each fully connected sub-module may be composed of one fully connected layer and one activation layer.

Figure 9B:
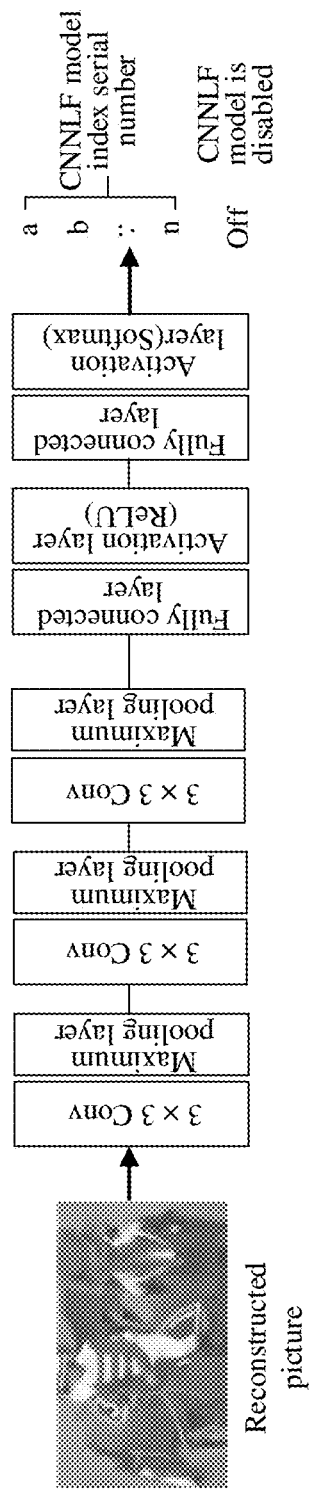
FIG. 9B is a schematic diagram of a network structure composition of another preset selection network model provided by an embodiment of the present disclosure.

In a specific example, as shown in FIG. 9B, the third neural network structure may be composed of a multi-layer convolution neural network and a multi-layer fully connected neural network. The network structure can include K convolution layers, M pooling layers, L fully connected layers and N activation layers, and K, M, L and N are all integers greater than or equal to 1.

In a more specific example, K=3, M=3, L=2, N=2.

Thus, based on the network structure shown in FIG. 9B, it may be composed of 3 convolution layers and 2 fully connected layers, and each convolution layer is followed by a pooling layer. The convolution kernel of the convolution layer can be 3×3, that is, it can be expressed by 3×3 Conv. The pooling layer can adopt a maximum pooling layer, which is represented by 2×2 MaxPool. In addition, each fully connected layer is followed by an activation layer, where the activation layer can be a linear activation function or a nonlinear activation function, such as ReLU and Softmax.

It should further be noted that for the preset selection network model (such as the candidate luma selection network model or the candidate chroma selection network model), the loss function can also be used to perform model training. In some embodiments, the method may further include the following operations.

A second training set and a preset loss function are determined. The second training set includes at least one training sample, and the training sample is obtained according to at least one kind of quantization parameter.

A third neural network structure is trained using the luma component of the training sample in the second training set, and at least one candidate luma selection network model is obtained when a loss value of the preset loss function converges to a loss threshold.

The third neural network structure is trained using the chroma component of the training sample in the second training set, and at least one candidate chroma selection network model is obtained when the loss value of the preset loss function converges to the loss threshold.

It should be noted that for the preset loss function, in a possible embodiment, the embodiment of the present disclosure also provides a method for training the model based on a weighted loss function. The weighted loss function is shown in the following formula:

$$\text{lossFunction} = (\text{clip}(Wa \times \text{rec}a + Wb \times \text{rec}b + \ldots + Wn \times \text{rec}n + W\text{off} \times \text{rec}0, 0, N) - \text{orig})^2$$

where the Wa, the Wb, ..., the Wn and the Woff respectively represent outputs of the preset selected network model, and represent probability values of at least one candidate in-loop filter network model a, b, ..., n and a case where the in-loop filter network model is not used (i.e., the model is disabled). The reca, the recb, ..., the recn, respectively, represent outputted reconstructed pictures using the candidate in-loop filter network models a, b, ..., n, and red) represents outputted reconstructed picture after the DBF and the SAO filter. The Clip function limits a value between 0 and N. N represents a maximum value of sample values, for example, for a 10 bit YUV picture, N is 1023. The orig represents an original picture.

Thus, at least two outputted probability values of the preset selected network model can be taken as weighting values of the outputted reconstructed picture of at least one candidate CNNLF model and the outputted reconstructed picture when the CNNLF model is not used, and finally the loss function value can be obtained by calculating a mean square error with respect to the original picture orig.

In another possible implementation, an embodiment of the present disclosure further provides a cross entropy loss function commonly used in classification networks which is applied to the technical solution of the embodiments of the present disclosure. The cross entropy loss function is as shown in the following formulas:

$$\text{label}(i) = \text{argmin}((\text{rec}a - \text{orig})^2, (\text{rec}b - \text{orig})^2, \ldots, (\text{rec}n - \text{orig})^2, (\text{rec}0 - \text{orig})^2)$$

$$\text{lossFunction} = -\text{label}(i) \times \log(\text{softmax}(Wi))$$

where the label(i) represents calculating mean square errors respectively for outputted reconstructed pictures of the at least one candidate in-loop filter network model a, b, . . . , n as well as an outputted reconstructed picture after the DBF and the SAO filter with respect to the original picture, and finding a value i of a sequence number corresponding to a minimum error thereof. The Wa, the Wb, . . . , the Wn and the Woff respectively represent outputs of the preset selected network model, and represent probability values of at least one candidate in-loop filter network model a, b, . . . , n and a case where the in-loop filter network model is not used (i.e., the model is disabled). The Wi represents a probability value with a same serial number as the label(i). Then the softmax of the Wi is calculated and multiplied by the label(i) so that the cross entropy loss value can be obtained.

Further, according to the above embodiments, after the preset selection network model and the at least one candidate in-loop filter network model is determined, the probability distribution conditions of each of the at least one candidate in-loop filter network model when the in-loop filter network model is used for the current block and a case where the in-loop filter network model is not used for the current block can further be determined. In some embodiments, the determining the at least two output values according to the preset selection network model of the current block may include the following operations.

A second reconstructed picture block of the current block is determined.

The second reconstructed picture block is inputted into the preset selection network model, to obtain the at least two output values.

Herein, the at least two output values include a first value corresponding to each of at least one candidate in-loop filter network model when an in-loop filter network model is used for the current block, and a second value when the in-loop filter network model is not used for the current block.

It should further be noted that taking output values being probability values as an example, the in-loop filter network model can be the CNNLF model mentioned above. After the second reconstructed picture block to be inputted into the CNNLF model is determined, the second reconstructed picture block is used as an input of the preset selection network model, and an output of the preset selection network model is the probability distribution conditions of the at least one candidate CNNLF model and a case where the CNNLF model is not used for the current block (including a first value corresponding to each of the at least one candidate CNNLF model and a second value when the CNNLF model is not used for the current block).

At S403, according to the at least two output values, a target in-loop filter network model when the in-loop filter network model is used for the current block is determined, or it is determined that the in-loop filter network model is not used for the current block.

At S404, when the in-loop filter network model is used for the current block, the current block is filtered using the target in-loop filter network model, to obtain a first reconstructed picture block of the current block.

It should be noted that after the first value corresponding to each of the at least one candidate CNNLF model and the second value when the CNNLF model is not used for the current block are determined, according to the at least two output values, the target in-loop filter network model when the in-loop filter network model is used for the current block can be determined, or it can be determined that the in-loop filter network model is not used for the current block.

In some embodiments, the determining, according to the at least two output values, the target in-loop filter network model when the in-loop filter network model is used for the current block or determining according to the at least two output values that the in-loop filter network model is not used for the current block may include the following operations.

A target value is determined from the at least two output values.

In response to the target value being the first value, it is determined that the in-loop filter network model is used for the current block, and a candidate in-loop filter network model corresponding to the target value is taken as the target in-loop filter network model.

Or, in response to the target value being the second value, it is determined that the in-loop filter network model is not used for the current block.

In a specific example, the determining the target value from the at least two output values may include: a maximum value is selected from the at least two output values as the target value.

That is to say, with respect to either the luma in-loop filter network model or the chroma in-loop filter network model, multiple candidate luma in-loop filter network models or multiple candidate chroma in-loop filter network models are obtained by training a model at first, and then a model decision is made by using the preset selection network model. If the second value of the at least two output values is a maximum value, it can be determined that the in-loop filter network model is not used for the current block. If the second value of the at least two output values is not a maximum value, a candidate in-loop filter network model corresponding to the maximum value of the first values is determined as the target in-loop filter network model, so that the current block can be filtered using the target in-loop filter network model.

It should further be noted that according to different colour component types, the preset selection network model includes the luma selection network model or the chroma selection network model. Thus, the second reconstructed picture block may also include an input reconstructed luma picture block and an input reconstructed chroma picture block.

In a possible embodiment, in a case where the colour component type of the current block is the luma component, the determining the at least two output values according to the preset selection network model of the current block may include the following operations.

An input reconstructed luma picture block of the luma in-loop filter network model is determined.

The input reconstructed luma picture block is inputted into the luma selection network model, to obtain the at least two luma output values.

Herein, the at least two luma output values include a first value corresponding to each of at least one candidate luma in-loop filter network model when an luma in-loop filter network model is used for the current block, and a second value when the luma in-loop filter network model is not used for the current block.

Further, in some embodiments, taking the luma output value being a probability value as an example, the method may further include: a maximum probability value is selected from the at least two luma output values. If the maximum probability value is the first value, it can be determined that the luma in-loop filter network model is used for the current block, and the candidate luma in-loop filter network model corresponding to the maximum probability value is taken as the target luma in-loop filter network model. Alternatively, if the maximum probability value is a second value, it is determined that the luma in-loop filter network model is not used for the current block.

In another possible embodiment, in a case where the colour component type of the current block is the chroma component, the determining the at least two output values according to the preset selection network model of the current block may include the following operations.

An input reconstructed chroma picture block of the chroma in-loop filter network model is determined.

The input reconstructed chroma picture block is inputted into the chroma selection network model, to obtain the at least two chroma output values.

Herein, the at least two chroma output values include a first value corresponding to each of at least one candidate chroma in-loop filter network model when an chroma in-loop filter network model is used for the current block, and a second value when the chroma in-loop filter network model is not used for the current block.

Further, in some embodiments, taking the chroma output value being a probability value as an example, the method may further include: a maximum probability value is selected from the at least two chroma output values. If the maximum probability value is the first value, it can be determined that the chroma in-loop filter network model is used for the current block, and the candidate chroma in-loop filter network model corresponding to the maximum probability value is taken as the target chroma in-loop filter network model. Alternatively, if the maximum probability value is a second value, it is determined that the chroma in-loop filter network model is not used for the current block.

Thus, after the target in-loop filter network model (including the target luma in-loop filter network model or the target chroma in-loop filter network model) used for the current block is determined, the current block can be filtered using the selected target in-loop filter network model. Specifically, in a possible embodiment, when the in-loop filter network model is used for the current block, the filtering the current block using the target in-loop filter network model, to obtain the first reconstructed picture block of the current block may include the following operations.

A second reconstructed picture block of the current block is determined.

The second reconstructed picture block is inputted into the target in-loop filter network model, to obtain the first reconstructed picture block of the current block.

In another possible embodiment, when the in-loop filter network model is not used for the current block, the method may further include: the second reconstructed picture block is determined as the first reconstructed picture block of the current block.

In short, after the at least two output values are determined, if a maximum value determined from the at least two output values is the second value, it means that a rate-distortion cost when the in-loop filter network model is not used for the current block is minimal, then it can be determined that the in-loop filter network model is not used for the current block, that is, the second reconstructed picture block is directly determined as the first reconstructed picture block of the current block. If the maximum value determined from the at least two output values is one of the first values, it means that that the rate-distortion cost when the in-loop filter network model is used for the current block is minimal, then a candidate in-loop filter network model corresponding to the first value can be determined as the target in-loop filter network model, and then the second reconstructed picture block is inputted into the target in-loop filter network model, to obtain the first reconstructed picture block of the current block.

In some embodiments, with respect to the second reconstructed picture block (including the input reconstructed luma picture block or the input reconstructed chroma picture block), the second reconstructed picture block may be obtained by filtering via a deblocking filter and a sample adaptive offset filter.

It should further be noted that the in-loop filter network model described in the embodiment of the present disclosure can be a CNNLF model. Thus, the selected CNNLF model is used to perform CNNLF filtering processing on the current block, and the first reconstructed picture block of the current block can be obtained.

Furthermore, in some embodiments, the method may further include: the first reconstructed picture block is filtered using an adaptive loop filter after the first reconstructed picture block is determined.

Figure 10:
FIG. 10 is a schematic diagram of an overall framework based on a preset selection network model provided by an embodiment of the present disclosure.

Exemplarily, referring to FIG. 10, a schematic diagram of an overall framework based on a preset selection network model provided by an embodiment of the present disclosure is shown. As shown in FIG. 10, in conjunction with the network structure shown in FIG. 9B, an input of the network structure is an input reconstructed luma picture block or an input reconstructed chroma picture block of the CNNLF model, and an output of the network structure is a probability value corresponding to each of at least one CNNLF model and a probability value when the CNNLF model is not used for the current block (i.e., a decision of disabling the CNNLF model is made). If a maximum output probability value corresponds to an index serial number of a CNNLF model, then the CNNLF model can be selected to perform a CNNLF filtering processing on the input reconstructed luma picture block or the input reconstructed chroma picture block. If the maximum probability value of the output corresponds to the decision of disabling the CNNLF model, then the neural network may not be used to perform the filtering processing. In addition, according to FIG. 10, the second reconstructed picture block is obtained by filtering via a DBF and an SAO filter, and then the first reconstructed picture block obtained from the second reconstructed picture block passing through a model adaptive selection module and a CNNLF model can be further inputted to an ALF for further filtering processing.

An embodiment of the present disclosure provides a decoding method, applied to a decoder. A value of first syntax element identification information is determined by parsing a bitstream; when the first syntax element identification information indicates that a preset selection network model is enabled to be used to perform a model decision for a current block, at least two output values are determined according to the preset selection network model of the current block; the at least two output values include a first value corresponding to each of at least one candidate in-loop filter network model when an in-loop filter network model is used for the current block, and a second value when the in-loop filter network model is not used for the current block; a target in-loop filter network model is determined according to the at least two output values when the in-loop filter network model is used for the current block, or it is determined according to the at least two output values that the in-loop filter network model is not used for the current block; and when the in-loop filter network model is used for the current block, the current block is filtered by using the target in-loop filter network model, to obtain a first reconstructed picture block of the current block. In such a manner, by introducing a neural network technology based on deep learning to perform adaptive decision on the in-loop filter network model, a target in-loop filter network model when the in-loop filter network model is used for the current block is determined or it is determined that the in-loop filter network model is not used for the current block; when the in-loop filter network model is used for the current block, the target in-loop filter network model can further be used to filter the current block, so that not only the complexity can be reduced, but also additional bit overheads can be avoided, thereby the coding performance can be improved, and then the encoding and decoding efficiency can be improved. In addition, a first reconstructed picture block finally outputted can be more closer to an original picture block, so that video picture quality can be improved.

Figure 11:
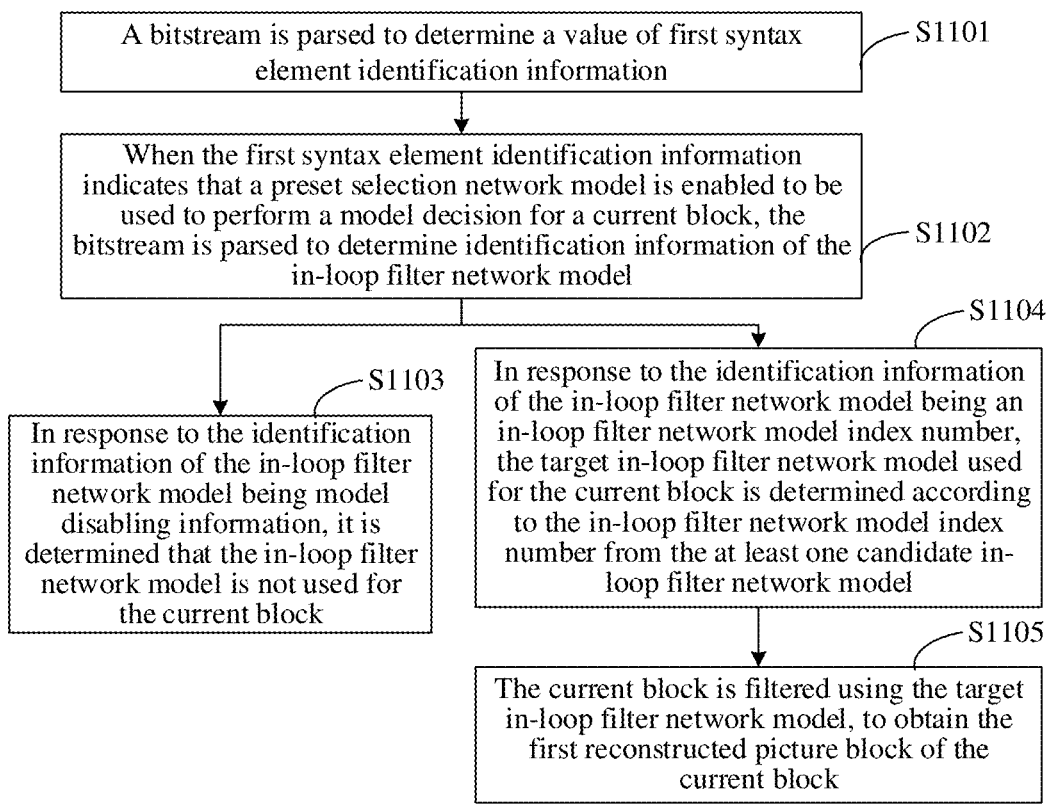
FIG. 11 is a schematic flowchart of another decoding method provided by an embodiment of the present disclosure.

In another embodiment of the present disclosure, in order to reduce the complexity of the decoder, referring to FIG. 11, a schematic flowchart of another decoding method provided by the embodiment of the present disclosure is shown. As shown in FIG. 11, the method may include the following operations.

At S1101, a bitstream is parsed to determine a value of first syntax element identification information.

At S1102, when the first syntax element identification information indicates that a preset selection network model is enabled to be used to perform a model decision for a current block, the bitstream is parsed to determine identification information of the in-loop filter network model.

At S1103, in response to the identification information of the in-loop filter network model being model disabling information, it is determined that the in-loop filter network model is not used for the current block.

At S1104, in response to the identification information of the in-loop filter network model being an in-loop filter network model index number, the target in-loop filter network model used for the current block is determined according to the in-loop filter network model index number from the at least one candidate in-loop filter network model.

At S1105, the current block is filtered using the target in-loop filter network model, to obtain the first reconstructed picture block of the current block.

It should be noted that in order to facilitate the decoder to determine whether a preset selection network model is enabled to be used to perform a model decision for a current block, first syntax element identification information can be set, and then the above determination can be performed according to a value of the first syntax element identification information obtained by decoding. The first syntax element identification information can be represented by model_adaptive_decision_enable_flag.

In a specific example, if a value of model_adaptive_decision_enable_flag is the first identification value, it can be determined that the preset selection network model is enabled to be used to perform a model decision for a current block. Alternatively, if the value of model_adaptive_decision_enable_flag is the second identification value, it can be determined that the preset selection network model is not enabled to be used to perform a model decision for a current block. Exemplarily, the first identification value can be 1 and the second identification value can be 0, which are not limited herein.

It should further be noted that in the embodiment of the present disclosure, identification information of an in-loop filter network model can be further set, which is used to determine an in-loop filter network model index number when the in-loop filter network model is used for the current block or determine that the in-loop filter network model is not used for the current block.

Taking the CNNLF model as an example, for the model adaptive decision module on the decoder side, the identification information of the in-loop filter network model determined by the model adaptive decision module on the encoder side is obtained by decoding. According to the identification information of the in-loop filter network model obtained by decoding, it can be determined that the in-loop filter network model is not used for the current block, or an index number of the in-loop filter network model used for the current block can be determined. According to the in-loop filter network model index number, the target in-loop filter network model used for the current block can be determined, and then CNNLF filtering processing is performed on the current block using the target in-loop filter network model, thereby reducing the complexity of the decoder.

In addition, with respect to the first neural network structure, the second neural network structure, the third neural network structure and the like in the foregoing embodiments, a number of convolution layers, a number of fully connected layers, the nonlinear activation function and the like included in the first neural network structure, the second neural network structure and the third neural network structure can be adjusted. In addition, besides the CNNLF model that is the in-loop filter network model targeted by the model adaptive decision module, the model adaptive decision can be performed on use of other efficient neural network filter models, which are not limited in the embodiments of the present disclosure.

In short, the embodiment of the present disclosure provides a deep learning based model adaptive decision module, which is used to perform adaptive decision on the use of the CNNLF model, so that it is no longer necessary to calculate the rate-distortion cost and transmit enable/disable information (such as picture-level enable/disable information and CTU-level enable/disable information), thereby avoiding additional bit overheads and improving coding performance. The model adaptive decision module can be regarded as a preset selection network model composed of a multi-layer convolution neural network and a multi-layer fully connected neural network. An input of the model adaptive decision module is the second reconstructed picture block of the current block (i.e., the input reconstructed picture block of the CNNLF model), and an output of the model adaptive decision module is probability distribution conditions of each CNNLF model and the decision of disabling the CNNLF model. The position of the model adaptive decision module in the encoder/decoder is shown in FIG. 5. The use of the model adaptive selection module does not depend on flag bits of the DBF, the SAO filter, the ALF and the CNNLF, only the position of the model adaptive selection module is set before the CNNLF.

In a specific example, the technical solution of the embodiments of the disclosure acts on the in-loop filter module of the decoder, and the specific flow is as follows.

The decoder acquires a bitstream and parses the bitstream, and when the parsing proceeds to the in-loop filter module, a process is performed according to a preset filter order. Herein, the preset filter order is DBF→SAO filter→model adaptive decision module→CNNLF→ALF. When the process arrives at the model adaptive decision module, following steps are performed.

(a) Firstly, whether the model adaptive decision module is enabled to be used to perform a model decision for a current block is determined according to the model_adaptive_decision_enable_flag obtained by decoding. If the model_adaptive_decision_enable_flag is "1", the model adaptive decision module is used to process the current block and the process proceeds to (b); if the model_adaptive_decision_enable_flag is "0", the process proceeds to (e).

(b) The colour component type of the current block is determined, and if the current block is a luma block, the process proceeds to (c); if the current block is a chroma block, the process proceeds to (d).

(c) For the luma component, the input reconstructed luma picture block of the CNNLF model is used as the input of the model adaptive decision module, and the output of the model adaptive decision module is the probability distribution conditions of each luma CNNLF model and a decision of disabling the luma CNNLF model. If the maximum output probability value corresponds to the decision of disabling the luma CNNLF model, the process proceeds to (e); if the maximum output probability value is an index serial number of a certain luma CNNLF model, the model is selected to perform CNNLF filtering processing on the current luma picture block, to obtain the finally output reconstructed luma picture block.

(d) For the chroma component, the input reconstructed chroma picture block of the CNNLF model is used as the input of the model adaptive decision module, and the output of the model adaptive decision module is the probability distribution conditions of each chroma CNNLF model and a decision of disabling the chroma CNNLF model. If the maximum output probability value corresponds to the decision of disabling the chroma CNNLF model, the process proceeds to (e); if the maximum output probability value is an index serial number of a certain chroma CNNLF model, the model is selected to perform CNNLF filtering processing on the current chroma picture block, to obtain the finally output reconstructed chroma picture block.

(e) If the processing of the current picture by the model adaptive decision module has completed, a next picture is loaded for processing, and then the process proceeds to (a).

In an implementation, modifications to syntax elements are as follows.

(1) For the definition of a sequence header, a modification to its syntax element is as shown in Table 1.

TABLE 1

| | Descriptor |
|---|---|
| sequence_header( ) { | |
| ... ... | |
|     model_adaptive_decision_enable_flag | u(1) |
| ... ... | ... ... |

An enable flag used in the model adaptive decision based on the neural network can be represented by model_adaptive_decision_enable_flag.

(2) For the definition of an intra prediction picture header, a modification to its syntax element is as shown in Table 2.

TABLE 2

| | Descriptor |
|---|---|
| intra_picture_header( ) { | |
| ... ... | |
|   if(!model_adaptive_decision_enable_flag) { | |
|     if (NnFilterEnableFlag) { | |
|       for (compIdx=0; compIdx<3; compIdx++) { | |
|         picture_nn_filter_enable_flag[comIdx] | u(1) |
|         if (PictureNnFilterEnableFlag[comIdx]) { | |
|           picture_nn_filter_adaptive_flag[comIdx] | u(1) |
|           if (PictureNnFilterAdaptiveFlag[comIdx] == 0) { | |
|             if (NumOfNnFilter > 1) { | |
|               picture_nn_filter_set_index[comIdx] | ue(v) |
|             } | |
|           } | |
|         } | |
|       } | |
|     } | |
|   } | |
| ... ... | ... ... |

When the enable flag model_adaptive_decision_enable_flag used in the model adaptive decision based on the neural network is "1", definitions of following semantics can be cancelled:
    a picture-level neural network filtering enable flag picture_nn_filter_enable_flag[compIdx];
    a picture-level selective filtering adaptive flag picture_nn_filter_adaptive_flag[compIdx]; and
    a picture-level neural network filtering model index picture_nn_filter_set_index[compIdx].

(3) For the definition of an inter prediction picture header, a modification to its syntax element is as shown in Table 3.

TABLE 3

| | Descriptor |
|---|---|
| inter_picture_header( ) { | |
| ... ... | |
|   if(!model_adaptive_decision_enable_flag) { | |
|     if (NnFilterEnableFlag) { | |
|       for (compIdx=0; compIdx<3; compIdx++) { | |
|         picture_nn_filter_enable_flag[comIdx] | u(1) |
|         if (PictureNnFilterEnableFlag[comIdx]) { | |
|           picture_nn_filter_adaptive_flag[comIdx] | u(1) |
|           if (PictureNnFilterAdaptiveFlag[comIdx] == 0) { | |
|             if (NumOfNnFilter > 1) { | |
|               picture_nn_filter_set_index[comIdx] | ue(v) |
|             } | |
|           } | |
|         } | |
|       } | |
|     } | |
|   } | |
| ... ... | ... ... |

When the enable flag model_adaptive_decision_enable_flag used in the model adaptive decision based on the neural network is "1", definitions of following semantics can be cancelled:
    a picture-level neural network filtering enable flag picture_nn_filter_enable_flag[compIdx];
    a picture-level selective filtering adaptive flag picture_nn_filter_adaptive_flag[compIdx]; and
    a picture-level neural network filtering model index picture_nn_filter_set_index[compIdx].

(4) For the definition of a patch, a modification to its syntax element is as shown in Table 4.

TABLE 4

| | Descriptor |
|---|---|
| patch( ) { <br> ... ... <br>     if(!model_adaptive_decision_enable_flag) { <br>       for (compIdx=0; compIdx<3; compIdx++) { <br>         if (pictureNnFilterAdaptiveFlag[compIdx]) { <br>           nn_filter_lcu_enable_flag[compIdx][LcuIdx] <br>           if (NnFilterLcuEnableFlag[compIdx][LcuIdx]) { <br>             if (NumOfNnFilter > 1) { <br>               nn_filter_lcu_set_index[compIdx][LcuIdx] <br>             } <br>           } <br>         } <br>       } <br>     } <br> } <br> ... ... | <br><br><br><br>ae(v)<br><br><br>ae(v)<br><br><br><br><br>}<br><br>... ... |

When the enable flag model_adaptive_decision_enable_flag used in the model adaptive decision based on the neural network is "1", definitions of following semantics can be cancelled:
    a maximum coding unit neural network filtering enable flag nn_filter_lcu_enable_flag[compIdx] [LcuIdx]; and
    a maximum coding unit neural network filter model index sequence number flag nn_filter_lcu_set_index [compIdx] [LcuIdx].

Through the above-mentioned embodiment, the specific implementation of the above-mentioned embodiments is described in detail. It can be seen that through the technical solution of the above-mentioned embodiment, by introducing a model adaptive decision technology based on deep learning, the second reconstructed picture block of the current block (i.e., the input reconstructed picture block of the CNNLF model) is inputted into the neural network structure having multiple convolution layers and multiple fully connected layers, and probability distribution conditions of each CNNLF model and a decision of disabling the CNNLF model are outputted, and a decision that an appropriate CNNLF model is used or a decision that the CNNLF model is not used is adaptively made for the second reconstructed picture block. Thus, it is no longer necessary to calculate the rate-distortion cost and transmit enable/disable information (such as picture-level enable/disable information and CTU-level enable/disable information), thereby avoiding additional bit overheads and improving coding performance.

Figure 12:
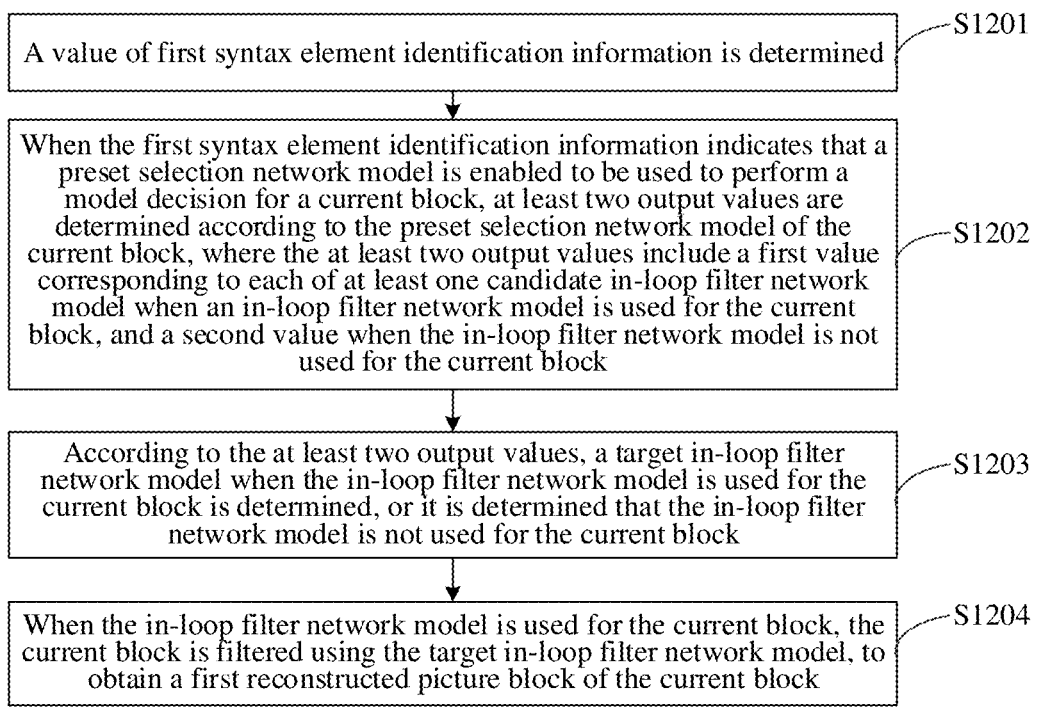
FIG. 12 is a schematic flowchart of an encoding method provided by an embodiment of the present disclosure.

In another embodiment of the present disclosure, referring to FIG. 2, a schematic flowchart of a encoding method provided by the embodiment of the present disclosure is shown. As shown in FIG. 12, the method can include the following operations.

At S1201, a value of first syntax element identification information is determined.

It should be noted that a video picture can be divided into multiple picture blocks, and each picture block currently to be encoded can be referred to as an encoding block. Herein, each encoding block may include a first picture component, a second picture component, and a third picture component. The current block is an encoding block for which an in-loop filtering processing of the first picture component, the second picture component or the third picture component is currently to be performed in the video picture. The current block herein can be a CTU, a CU, or even a block smaller than the CU, which is not limited in the embodiment of the present disclosure.

Herein, with respect to the first picture component, the second picture component and the third picture component, in the embodiments of the present disclosure, they may be divided into two colour component types, i.e., a luma component and a chroma component, from a perspective of colour division. In such a case, if operations such as prediction of a luma component, inverse transform and inverse quantization and loop filtering are to be performed on the current block, the current block can also be referred to as a luma block. Alternatively, if operations such as prediction of a chroma component, inverse transform and inverse quantization and loop filtering are to be performed on the current block, the current block can also be referred to as a chroma block.

It should further be noted that, at the encoder side, an embodiment of the present disclosure specifically provides an in-loop filtering method, and particularly a deep learning based method for adaptive decision on using an in-loop filter network model, which is applied to the filtering unit 108 as shown in FIG. 3A. Herein, the filtering unit 108 may include a DBF, an SAO filter, a CNNLF and an ALF. For the filtering unit 108, a CNNLF model in the filtering unit 108 can be adaptively decided according to the method described in the embodiment of the present disclosure, so that a target model can be determined when the CNNLF model is used for the current block or it is determined that the CNNLF model is not used for the current block.

More specifically, an embodiment of the present disclosure provides a deep learning based model adaptive decision module, which is specifically the model adaptive selection module shown in FIG. 5. The model adaptive selection module can be used to perform an adaptive decision on whether an in-loop filter network model (such as the CNNLF model) is used or not and which CNNLF model is used, to improve coding performance.

In the embodiment of the present disclosure, for the model adaptive decision module, whether a preset selection network model is enabled to be used to perform a model decision for a current block or not can be indicated by first syntax element identification information. In some embodiments, the determining the value of the first syntax element identification information includes:
    in response to the preset selection network model being enabled to be used to perform the model decision for the current block, the value of the first syntax element identification information is determined as a first identification value; and/or
    in response to the preset selection network model being not enabled to be used to perform the model decision for the current block, the value of the first syntax element identification information is determined as a second identification value.

Further, the method also include: the value of the first syntax element identification information is encoded, and encoded bits are signalled.

That is to say, at first, first syntax element identification information can be set to indicate whether the preset selection network model is enabled to be used to perform the model decision for the current block. Herein, in response to the preset selection network model being enabled to be used to perform the model decision for the current block, the value of the first syntax element identification information can be determined as the first identification value; in response to the preset selection network model being not enabled to be used to perform the model decision for the current block, the value of the first syntax element identification information can be determined as the second identification value. Thus, in the encoder, after the value of the first syntax element identification information is determined, the value of the first syntax element identification information is signalled, and the bitstream is transmitted to the decoder, so that the decoder can know whether the preset selection network model is enabled to be used to perform the model decision for the current block by parsing the bitstream.

Herein, the first identification value and the second identification value are different values, and the first identification value and the second identification value can be in the form of parameters or numbers. Specifically, the first syntax element identification information may be a parameter written in a profile or a value of a flag, which is not limited in the embodiments of the present disclosure.

Taking the first syntax element identification information being a flag as an example, at this time, for the first identification value and the second identification value, the first identification value can be set to 1 and the second identification value can be set to 0. Alternatively, the first identification value can be set to true and the second identification value can be set to false. Alternatively, the first identification value can also be set to 0, and the second identification value can also be set to 1. Alternatively, the first identity value can be set to false and the second identity value can be set to true. For example, as to the flag, generally the first identification value can be 1 and the second identification value can be 0, which are not limited herein.

It should further be noted that the preset selection network model can be regarded as a neural network, and the first syntax element identification information can be regarded as an enable flag for a neural network based model adaptive decision, which can be represented by model_adaptive_decision_enable_flag here. Specifically, the model_adaptive_decision_enable_flag can be used to indicate whether a preset selection network model is enabled to be used to perform a model decision for a current block.

In this way, taking the first identification value being 1 and the second identification value being 0 as an example, if the value of model_adaptive_decision_enable_flag is 1, it can be determined that the preset selection network model is enabled to be used to perform the model decision for the current block. If the value of model_adaptive_decision_enable_flag is 0, it can be determined that the preset selection network model is not enabled to be used to perform the model decision for the current block.

At S1202, when the first syntax element identification information indicates that a preset selection network model is enabled to be used to perform a model decision for a current block, at least two output values are determined according to the preset selection network model of the current block. The at least two output values include a first value corresponding to each of at least one candidate in-loop filter network model when an in-loop filter network model is used for the current block, and a second value when the in-loop filter network model is not used for the current block.

It should be noted that if the preset selection network model is enabled to be used to perform the model decision for the current block, then the preset selection network model used for the current block can be determined from multiple candidate preset selection network models according to colour component types of the current block, quantization parameters of the current block and picture types of a picture to which the current block belongs, and then according to the preset selection network model, probability distribution conditions of at least one candidate in-loop filter network model when the in-loop filter network model is used for the current block and probability distribution conditions when the in-loop filter network model is not used for the current block can be determined. Specifically, in the embodiments of the present disclosure, the at least two output values include a first value corresponding to each of at least one candidate in-loop filter network model when the in-loop filter network model is used for the current block, and a second value when the in-loop filter network model is not used for the current block.

In a more specific example, the first value can be used to reflect the probability distribution conditions of the at least one candidate in-loop filter network model when the in-loop filter network model is used for the current block, and the second value can be used to reflect the probability distribution conditions when the in-loop filter network model is not used for the current block. In other words, both the first value and the second value can be expressed as probability values. That is, the at least two output values determined according to the preset selection network model can be at least two probability values. Alternatively, the first value and the second value can also be used to reflect weight distribution conditions of the at least one candidate in-loop filter network model when the in-loop filter network model is used for the current block and weight distribution conditions when the in-loop filter network model is not used for the current block. That is, the first value and the second value can also be referred to as the weight values, which are not limited in the embodiments of the present disclosure.

It should be understood that with respect to colour component types, it can include a luma component and a chroma component. The preset selection network model herein is not the same for different colour component types. In the embodiments of the present disclosure, the preset selection network model corresponding to the luma component can be referred to as a luma selection network model, and the preset selection network model corresponding to the chroma component can be referred to as a chroma selection network model. Thus, in some embodiments, the determining the preset selection network model for the current block may include the following operations.

In response to the colour component type of the current block being the luma component (i.e., the current block is the luma block), a luma selection network model of the current block is determined.

Or, in response to the colour component type of the current block being the chroma component (i.e., the current block is the chroma block), a chroma selection network model of the current block is determined.

Accordingly, the candidate in-loop filter network models are different for different colour component types. In the embodiments of the present disclosure, one or more candidate in-loop filter network models corresponding to the luma component can be referred to as candidate luma in-loop filter network models, and one or more candidate in-loop filter network models corresponding to the chroma component can be referred to as candidate chroma in-loop filter network models. Thus, in some embodiments, the determining the at least two output values according to the preset selection network model of the current block may include the following operations.

In response to the colour component type of the current block being the luma component, at least two luma output values are determined according to the luma selection network model, where the at least two luma output values include a first value corresponding to each of at least one candidate luma in-loop filter network model when the luma in-loop filter network model is used for the current block, and a second value when the luma in-loop filter network model is not used for the current block.

Or, in response to the colour component type of the current block being the chroma component, at least two chroma output values are determined according to the chroma selection network model, where the at least two chroma output values include a first value corresponding to each of at least one candidate chroma in-loop filter network model when the chroma in-loop filter network model is used for the current block, and a second value when the chroma in-loop filter network model is not used for the current block.

Furthermore, for the picture types, it can include I-picture, P-picture and B-picture. In the embodiments of the present disclosure, the picture types may include a first type and a second type. The preset selection network models herein are also different for different picture types. In a specific example, the first type may be I-picture and the second type may be a non-I-picture. It should be noted that no specific limitations are made herein.

In a possible embodiment, for the luma selection network model, the luma selection network model corresponding to the first type can be referred to as a first luma selection network model, and the luma selection network model corresponding to the second type can be referred to as a second luma selection network model. Thus, in some embodiments, in a case where the colour component type of the current block is the luma component, the determining the luma selection network model of the current block may include the following operations.

In response to a picture type of a picture to which the current block belongs being the first type, a first luma selection network model of the current block is determined.

Or, in response to the picture type of the picture to which the current block belongs being the second type, a second luma selection network model of the current block is determined.

Accordingly, for the candidate luma in-loop filter network model, according to different picture types, the candidate luma in-loop filter network models are also different. Specifically, candidate luma in-loop filter network models corresponding to the first type can be referred to as candidate first luma selection network models, and candidate luma in-loop filter network models corresponding to the second type can be referred to as candidate second luma selection network models. Thus, in some embodiments, the determining the at least two luma output values according to the luma selection network model may include the following operations.

In response to the picture type of the picture to which the current block belongs being the first type, the at least two luma output values are determined according to the first luma selection network model, where the at least two luma output values include a first value corresponding to each of at least one candidate first luma in-loop filter network model when the first luma in-loop filter network model is used for the current block, and a second value when the first luma in-loop filter network model is not used for the current block.

Or, in response to the picture type of the picture to which the current block belongs being the second type, the at least two luma output values are determined according to the second luma selection network model, where the at least two luma output values include a first value corresponding to each of at least one candidate second luma in-loop filter network model when the second luma in-loop filter network model is used for the current block, and a second value when the second luma in-loop filter network model is not used for the current block.

Further, in the embodiments of the present disclosure, for the one or more candidate in-loop filter network models corresponding to the luma component (referred to as "candidate luma in-loop filter network models"), whether the at least one candidate first luma in-loop filter network model corresponding to the first type or the at least one candidate second luma in-loop filter network model corresponding to the second type, all these candidate in-loop filter network models are obtained through model training.

In some embodiments, the method may further include the following operations.

A first training set is determined. The first training set includes at least one first training sample and at least one second training sample, the picture type of the first training sample is the first type, the picture type of the second training sample is the second type, and both the first training sample and the second training sample are obtained according to at least one kind of quantization parameter.

A first neural network structure is trained using the luma component of the at least one first training sample, to obtain at least one candidate first luma in-loop filter network model.

The first neural network structure is trained using the luma component of the at least one second training sample, to obtain at least one candidate second luma in-loop filter network model.

Herein, the first neural network structure includes at least one of the following: a convolution layer, an activation layer, a residual module, and a skip connection layer.

That is to say, the at least one candidate first luma in-loop filter network model and the at least one candidate second luma in-loop filter network model are determined by training the first neural network structure based on the at least one training sample, and the at least one candidate first luma in-loop filter network model and the at least one candidate second luma in-loop filter network model have corresponding relationships with picture types, colour component types and quantization parameters.

In another possible embodiment, for the chroma selection network model, the chroma selection network model corresponding to the first type can be referred to as a first chroma selection network model, and the chroma selection network model corresponding to the second type can be referred to as a second chroma selection network model. Thus, in some embodiments, in a case where the colour component type of the current block is the chroma component, the determining the chroma selection network model of the current block may include the following operations.

In response to a picture type of a picture to which the current block belongs being the first type, a first chroma selection network model of the current block is determined.

Or, in response to the picture type of the picture to which the current block belongs being the second type, a second chroma selection network model of the current block is determined.

Accordingly, for the candidate chroma in-loop filter network model, according to different picture types, the candidate chroma in-loop filter network models are also different. Specifically, one or more candidate chroma in-loop filter network models corresponding to the first type can be referred to as candidate first chroma selection network models, and one or more candidate chroma in-loop filter network models corresponding to the second type can be referred to as candidate second chroma selection network models. Thus, in some embodiments, the determining the at least two chroma output values according to the chroma selection network model may include the following operations.

In response to the picture type of the picture to which the current block belongs being the first type, the at least two chroma output values are determined according to the first chroma selection network model, where the at least two chroma output values include a first value corresponding to each of at least one candidate first chroma in-loop filter network model when the first chroma in-loop filter network model is used for the current block, and a second value when the first chroma in-loop filter network model is not used for the current block.

Or, in response to the picture type of the picture to which the current block belongs being the second type, the at least two chroma output values are determined according to the second chroma selection network model, where the at least two chroma output values include a first value corresponding to each of at least one candidate second chroma in-loop filter network model when the second chroma in-loop filter network model is used for the current block, and a second value when the second chroma in-loop filter network model is not used for the current block.

Further, in the embodiments of the present disclosure, for the one or more candidate in-loop filter network models corresponding to the luma component (referred to as "candidate chroma in-loop filter network models"), whether the at least one candidate first chroma in-loop filter network model corresponding to the first type or the at least one candidate second chroma in-loop filter network model corresponding to the second type, all these candidate in-loop filter network models are obtained through model training.

In some embodiments, the method may further include the following operations.

A first training set is determined. The first training set includes at least one first training sample and at least one second training sample, the picture type of the first training sample is the first type, the picture type of the second training sample is the second type, and both the first training sample and the second training sample are obtained according to at least one kind of quantization parameter.

A second neural network structure is trained using the chroma component of the at least one first training sample, to obtain at least one candidate first chroma in-loop filter network model.

The second neural network structure is trained using the chroma component of the at least one second training sample, to obtain at least one candidate second chroma in-loop filter network model.

Herein, the second neural network structure includes at least one of the following: a convolution layer, an activation layer, a residual block, and a skip connection layer.

That is to say, the at least one candidate first chroma in-loop filter network model and the at least one candidate second chroma in-loop filter network model are determined by training the second neural network structure based on the at least one training sample, and the at least one candidate first chroma in-loop filter network model and the at least one candidate second chroma in-loop filter network model have corresponding relationships with picture types, colour component types and quantization parameters.

In a specific example, the first neural network structure may include a first convolution module, a first residual module, a second convolution module and a first connection module. For the first neural network structure, the first convolution module is composed of one convolution layer and one activation layer, the second convolution module is composed of two convolution layers and one activation layer, the connection module is composed of a skip connection layer, the first residual module includes multiple residual blocks, and each residual block is composed of two convolution layers and one activation layer.

In another specific example, the second neural network structure includes an up-sampling module, a third convolution module, a fourth convolution module, a fusion module, a second residual module, a fifth convolution module and a second connection module. For the second neural network structure, the third convolution module is composed of one convolution layer and one activation layer, the fourth convolution module is composed of one convolution layer and one activation layer, the fifth convolution module is composed of two convolution layers, one activation layer and one pooling layer, the connection module is composed of a skip connection layer, the second residual module includes multiple residual blocks, and each residual block is composed of two convolution layers and one activation layer.

As an example, taking the in-loop filter network model as the CNNLF, different network structures for the luma component and the chroma component are designed for the CNNLF, respectively. As shown in FIG. 6A and FIG. 7A in details, a first neural network structure is designed for the luma component. As shown in FIG. 6B and FIG. 7B in details, a second neural network structure is designed for the chroma component.

For the luma component, as shown in FIG. 7A, the whole network structure can include a convolution layer, an activation layer, a residual block, and a skip connection layer. Herein, the convolution kernel of the convolution layer can be 3×3, that is, it can be expressed by 3×3 Conv. The activation layer can be a linear activation function, that is, it can be expressed by Rectified Linear Unit (ReLU), which can also be referred to as a linear rectification function. The ReLU is commonly used in artificial neural networks, which usually refers to nonlinear functions represented by ramp function and its variants. As shown in a dashed box in FIG. 8, the network structure of the residual block (ResBlock) can include a convolution layer (Conv), an activation layer (ReLU), and a skip connection layer (Concat). In the network structure, the skip connection layer refers to a global skip connection from an input to an output included in the network structure, which can enable the network focus on learning residuals and accelerate a convergence process of the network.

For the chroma component, as shown in FIG. 7B, the luma component is introduced as one of inputs to guide filtering of the chroma component. The whole network structure can include a convolution layer, an activation layer, a residual block, a pooling layer, and a skip connection layer. Because of the inconsistency in terms of resolution, the chroma component needs to be up-sampled at first. In order to avoid introducing other noises in the up-sampling process, the resolution can be enlarged by directly copying neighbouring samples, so as to obtain an enlarged chroma picture. In addition, at the end of the network structure, the pooling layer (such as 2×2 AvgPool) is used to perform down-sampling of the chroma component. Specifically, in an application of the HPM-ModAI, a number of residual blocks of the luma component network may be set to N=20, and a number of residual blocks of the chroma component network may be set to N=10.

Herein, the use of the CNNLF can include two stages: an offline training stage and an inference test stage. In the offline training stage, 16 candidate in-loop filter network models, such as 4 I-picture luma component models, 4 non-I-picture luma component models, 4 chroma U-component models and 4 chroma V-component models, can be obtained through offline training. Specifically, pictures in a preset picture data set (e.g. DIV2K, the data set has 1000 high-definition pictures (resolution of 2K), of which 800 are for training, 100 are for verification, and 100 are for testing) are converted from RGB to a single-picture video sequence in a YUV4:2:0 format as labeled data. The sequence is then encoded using an HPM in an All Intra configuration, traditional filters such as the DBF, the SAO filter and the ALF are disabled, and a quantization step is set to 27 to 50. According to four intervals divided by ranges of QP 27-31, 32-37, 38-44 and 45-50, the reconstructed sequence obtained by encoding are divided into 128×128 picture blocks as training data, and four I-picture luma component models, four chroma U-component models and four chroma V-component models are trained respectively. Furthermore, the preset video data set (such as BVI-DVC) is encoded using an HPM-ModAI in an Random Access configuration, traditional filters such as the DBF, the SAO filter and the ALF are disabled, and a CNNLF of I-picture is enabled, coded and reconstructed non-I-picture data is collected, and four non-I-picture luma component models are trained respectively.

In the inference test stage, the HPM-ModAI sets, for the luma component, a picture-level flag bit and a CTU-level flag bit in a switch form to control whether the CNNLF model is enabled, and sets, for the chroma component, a picture-level flag bit in a switch form to control whether the CNNLF model is enabled. Herein, the flag bit can usually be represented by a flag. In addition, the picture-level flag bit is determined by equation (1), where $D=D_{net}-D_{rec}$ represents reduced distortion after CNNLF processing ($D_{net}$ represents a distortion after filtering, and $D_{rec}$ represents a distortion before filtering), R represents a number of CTUs of the current picture, $\lambda$ is the same as $\lambda$ of the adaptive loop filter. When RDcost is negative, the picture-level flag bit is enabled, and otherwise the picture-level flag bit is disabled.

$$RDcost = D + \lambda \times R \quad (1)$$

When the picture-level flag bit is enabled, it is necessary to further decide whether the CNNLF model is enabled in each CTU through the rate-distortion cost manner. Herein, the CTU-level flag bit is set to control whether the CNNLF is enabled. Specifically, the CTU-level flag bit is determined by equation (2).

$$RDcost = D \quad (2)$$

In a possible implementation, in the HPM-ModAI, the encoder can determine whether the CNNLF model is used for the current picture or the current block to perform the filtering processing through the rate-distortion cost manner. However, in this case, enable/disable information, such as picture-level enable/disable information and CTU-level enable/disable information, needs to be signalled, resulting in additional bit overheads.

In another possible embodiment, an embodiment of the present disclosure proposes a preset selection network model based on deep learning, which can perform an adaptive decision on the use of the CNNLF model, and at this time, it is no longer necessary to calculate the rate-distortion cost and the enable/disable information, such as the picture-level enable/disable information and the CTU-level enable/disable information.

Specifically, corresponding preset selection network models are different for different colour component types. Herein, the preset selection network model corresponding to the luma component can be referred to as a luma selection network model, and the preset selection network model corresponding to the chroma component can be referred to as a chroma selection network model.

In a possible embodiment, in a case where the colour component type of the current block is the luma component, the determining the luma selection network model of the current block may include the following operations.

At least one candidate luma selection network model is determined, where the candidate luma selection network model includes a candidate first luma in-loop filter network model and/or a candidate second luma in-loop filter network model.

The picture type of the picture to which the current block belongs and quantization parameters of the current block are determined.

In response to the picture type being the first type, at least one candidate first luma selection network model corresponding to the first type is determined from the at least one candidate luma selection network model, and the first luma selection network model of the current block is determined from the at least one candidate first luma selection network model according to the quantization parameters.

Or, in response to the picture type being the second type, at least one candidate second luma selection network model corresponding to the second type is determined from the at least one candidate luma selection network model, and the second luma selection network model of the current block is determined from the at least one candidate second luma selection network model according to the quantization parameters.

In another possible embodiment, in a case where the colour component type of the current block is the chroma component, the determining the chroma selection network model of the current block may include the following operations.

At least one candidate chroma selection network model is determined, where the candidate chroma selection network model includes a candidate first chroma in-loop filter network model and/or a candidate second chroma in-loop filter network model.

The picture type of the picture to which the current block belongs and quantization parameters of the current block are determined.

In response to the picture type being the first type, at least one candidate first chroma selection network model corresponding to the first type is determined from the at least one candidate chroma selection network model, and the first chroma selection network model of the current block is determined from the at least one candidate first chroma selection network model according to the quantization parameters.

Or, in response to the picture type being the second type, at least one candidate second chroma selection network model corresponding to the second type is determined from the at least one candidate chroma selection network model, and the second chroma selection network model of the current block is determined from the at least one candidate second chroma selection network model according to the quantization parameters.

It should be noted that the preset selection network model of the current block is not only related to the quantization parameters, but also related to the picture types and the colour component types. Different colour component types correspond to different preset selection network models. For example, for the luma component, the preset selection network model can be a luma selection network model related to the luma component; for the chroma component, the preset selection network model can be a chroma selection network model related to the chroma component. Moreover, different picture types correspond to different preset selection network models. For a luma selection network model related to the luma component, a luma selection network model corresponding to the first type can be referred to as the first luma selection network model, and a luma selection network model corresponding to the second type can be referred to as the second luma selection network model. For a chroma selection network model related to the chroma component, a chroma selection network model corresponding to the first type can be referred to as a first chroma selection network model, and a chroma selection network model corresponding to the second type can be referred to as the second chroma selection network model.

It should further be noted that in the embodiments of the present disclosure, at least one candidate luma selection network model (including the candidate first luma selection network model and/or the candidate second luma selection network model) and at least one candidate chroma selection network model (including the candidate first chroma selection network model and/or the candidate second chroma selection network model) can be trained in advance according to different quantization parameters, such as QP having values of 27-31, 32-37, 38-44, 45-50, and according to different picture types, such as the first type and the second type.

In such a manner, for the luma component, after the picture type of the current block is determined, and assuming that the picture type is an I-picture, at least one candidate I-picture luma selection network model corresponding to the I-picture type can be determined from the at least one candidate luma selection network model; and according to a quantization parameter of the current block, the I-picture luma selection network model corresponding to the quantization parameters (i.e., the luma selection network model of the current block) can be determined from the at least one candidate I-picture luma selection network model. Alternatively, assuming that the picture type is a non-I-picture, at least one candidate non-I-picture luma selection network model corresponding to the I-picture type can be determined from the at least one candidate luma selection network model; and according to a quantization parameter of the current block, the non-I-picture luma selection network model corresponding to the quantization parameters (i.e., the luma selection network model of the current block) can be determined from the at least one candidate non-I-picture luma selection network model. In addition, for the chroma component, the chroma selection network model is determined in a same manner as for the luma component, which will not be described in detail herein.

Further, with respect to the model training of the at least one candidate luma selection network model and the at least one candidate chroma selection network model, in some embodiments, the method may further include the following operations.

A second training set is determined. The second training set includes at least one training sample, and the training sample is obtained according to at least one kind of quantization parameter.

A third neural network structure is trained using the luma component of the training sample in the second training set, to obtain at least one candidate luma selection network model.

The third neural network structure is trained using the chroma component of the training sample in the second training set, to obtain at least one candidate chroma selection network model.

That is to say, the at least one candidate luma selection network model is determined by training the third neural network structure based on the at least one training sample, and the at least one candidate luma selection network model has corresponding relationship with picture types, colour component types and quantization parameters. In addition, the at least one candidate chroma selection network model is also determined by training the third neural network structure based on the at least one training sample, and the at least one candidate chroma selection network model has corresponding relationship with picture types, colour component types and quantization parameters.

It should be noted that in the embodiments of the present disclosure, the third neural network structure may include at least one of the following: a convolution layer, a pooling layer, a fully connected layer and an activation layer.

In a specific example, the third neural network structure includes a sixth convolution module and a fully connected module sequentially connected. The sixth convolution module includes multiple convolution sub-modules, and the convolution sub-module is composed of one convolution layer and one pooling layer. The fully connected module includes multiple fully connected sub-modules, and the fully connected sub-module is composed of one fully connected layer and one activation layer.

That is to say, the preset selection network model can be composed of a multi-layer convolution neural network and a multi-layer fully connected layer neural network, and then the preset selection network model of the current block, such as the luma selection network model or the chroma selection network model, is obtained by performing deep learning using the training sample.

Exemplarily, taking FIG. 9B as an example, the third neural network structure may consist of 3 convolution layers and 2 fully connected layers, and each convolution layer is followed by a pooling layer. The convolution kernel of the convolution layer can be 3×3, that is, it can be expressed by 3×3 Conv. The pooling layer can adopt a maximum pooling layer, which is represented by 2×2 MaxPool. In addition, each fully connected layer is followed by an activation layer, where the activation layer can be a linear activation function or a nonlinear activation function, such as ReLU and Softmax.

It should further be noted that for the preset selection network model (such as the candidate luma selection network model or the candidate chroma selection network model), the loss function can also be used to perform model training. In some embodiments, the method may further include the following operations.

A second training set and a preset loss function are determined. The second training set includes at least one training sample, and the training sample is obtained according to at least one kind of quantization parameter.

A third neural network structure is trained using the luma component of the training sample in the second training set, and at least one candidate luma selection network model is obtained when a loss value of the preset loss function converges to a loss threshold.

The third neural network structure is trained using the chroma component of the training sample in the second training set, and at least one candidate chroma selection network model is obtained when the loss value of the preset loss function converges to the loss threshold.

It should be noted that for the preset loss function, in a possible embodiment, the embodiment of the present disclosure also provides a method for training the model based on a weighted loss function. The weighted loss function is shown in the following formula:

$$\text{lossFunction} = (\text{clip}(Wa \times \text{rec}a + Wb \times \text{rec}b + \ldots + Wn \times \text{rec}n + W\text{off} \times \text{rec}0, 0, N) - \text{orig})^2$$

where the Wa, the Wb, ..., the Wn and the Woff respectively represent outputs of the preset selected network model, and represent probability values of at least one candidate in-loop filter network model a, b, ..., n and a case where the in-loop filter network model is not used (i.e., the model is disabled). The reca, the recb, ..., the recn, respectively, represent outputted reconstructed pictures using the candidate in-loop filter network models a, b, ..., n, and rec0) represents outputted reconstructed picture after the DBF and the SAO filter. The Clip function limits a value between 0 and N. N represents a maximum value of sample values, for example, for a 10 bit YUV picture, N is 1023. The orig represents an original picture.

Thus, at least two outputted probability values of the preset selected network model can be taken as weighting values of the outputted reconstructed picture of at least one candidate CNNLF model and the outputted reconstructed picture when the CNNLF model is not used, and finally the loss function value can be obtained by calculating the mean square error with respect to the original picture orig.

In another possible implementation, an embodiment of the present disclosure further provides a cross entropy loss function commonly used in classification networks which is applied to the technical solution of the embodiments of the present disclosure. As shown in the following formulas:

$$\text{label}(i) = \text{argmin}((\text{rec}a - \text{orig})^2, (\text{rec}b - \text{orig})^2, \ldots, (\text{rec}n - \text{orig})^2, (\text{rec}0 - \text{orig})^2)$$

$$\text{lossFunction} = -\text{label}(i) \times \log(\text{softmax}(Wi))$$

where the label(i) represents calculating mean square errors respectively for outputted reconstructed pictures of the at least one candidate in-loop filter network model a, b, ..., n as well as an outputted reconstructed picture after the DBF and the SAO filter with respect to the original picture, and finding a value i of a sequence number corresponding to a minimum error thereof. The Wa, the Wb, ..., the Wn and the Woff respectively represent outputs of the preset selected network model, and represent probability values of at least one candidate in-loop filter network model a, b, ..., n and a case where the in-loop filter network model is not used (i.e., the model is disabled). The Wi represents a probability value with a same serial number as the label(i). Then the softmax of the Wi is calculated and multiplied by the label(i) so that the cross entropy loss value can be obtained.

Further, according to the above embodiments, after the preset selection network model and the at least one candidate in-loop filter network model is determined, the probability distribution conditions of each of the at least one candidate in-loop filter network model when the in-loop filter network model is used for the current block and a case where the in-loop filter network model is not used for the current block can further be determined. In some embodiments, the determining the at least two output values according to the preset selection network model of the current block may include the following operations.

A second reconstructed picture block of the current block is determined.

The second reconstructed picture block is inputted into the preset selection network model, to obtain the at least two output values.

Herein, the at least two output values include a first value corresponding to each of at least one candidate in-loop filter network model when an in-loop filter network model is used for the current block, and a second value when the in-loop filter network model is not used for the current block.

It should further be noted that taking output values as probability values as an example, the in-loop filter network model can be the CNNLF model mentioned above. After the second reconstructed picture block to be inputted into the CNNLF model is determined, the second reconstructed picture block is used as an input of the preset selection network model, and an output of the preset selection network model is the probability distribution conditions of the at least one candidate CNNLF model and a case where the CNNLF model is not used for the current block (including a first value corresponding to each of the at least one candidate CNNLF model and a second value when the CNNLF model is not used for the current block).

At S1203, according to the at least two output values, a target in-loop filter network model when the in-loop filter network model is used for the current block is determined, or it is determined that the in-loop filter network model is not used for the current block.

At S1204, when the in-loop filter network model is used for the current block, the current block is filtered using the target in-loop filter network model, to obtain a first reconstructed picture block of the current block.

It should be noted that after the first value corresponding to each of the at least one candidate CNNLF model and the second value when the CNNLF model is not used for the current block, according to the at least two output values are determined, the target in-loop filter network model when the in-loop filter network model is used for the current block can be determined, or it can be determined that the in-loop filter network model is not used for the current block.

In some embodiments, the determining, according to the at least two output values, the target in-loop filter network model when the in-loop filter network model is used for the current block or determining according to the at least two output values that the in-loop filter network model is not used for the current block may include the following operations.

A target value is determined from the at least two output values.

In response to the target value being the first value, it is determined that the in-loop filter network model is used for the current block, and a candidate in-loop filter network model corresponding to the target value is taken as the target in-loop filter network model.

Or, in response to the target value being the second value, it is determined that the in-loop filter network model is not used for the current block.

In a specific example, the determining the target value from the at least two output values may include: a maximum value is selected from the at least two output values as the target value.

That is to say, with respect to either the luma in-loop filter network model or the chroma in-loop filter network model, multiple candidate luma in-loop filter network models or multiple candidate chroma in-loop filter network models are obtained by training a model at first, and then a model decision is made by using the preset selection network model. If the second value of the at least two output values is a maximum value, it can be determined that the in-loop filter network model is not used for the current block. If the second value of the at least two output values is not a maximum value, a candidate in-loop filter network model corresponding to the maximum value of the first values is determined as the target in-loop filter network model, so that the current block can be filtered using the target in-loop filter network model.

It should further be noted that according to different colour component types, the preset selection network model includes the luma selection network model or the chroma selection network model. Thus, the second reconstructed picture block may also include an input reconstructed luma picture block and an input reconstructed chroma picture block.

In a possible embodiment, in a case where the colour component type of the current block is the luma component, the determining the at least two output values according to the preset selection network model of the current block may include the following operations.

An input reconstructed luma picture block of the luma in-loop filter network model is determined.

The input reconstructed luma picture block is inputted into the luma selection network model, to obtain the at least two luma output values.

Herein, the at least two luma output values include a first value corresponding to each of at least one candidate luma in-loop filter network model when an luma in-loop filter network model is used for the current block, and a second value when the luma in-loop filter network model is not used for the current block.

Further, in some embodiments, taking the luma output value being a probability value as an example, the method may further include: a maximum probability value is selected from the at least two luma output values. If the maximum probability value is the first value, it can be determined that the luma in-loop filter network model is used for the current block, and the candidate luma in-loop filter network model corresponding to the maximum probability value is taken as the target luma in-loop filter network model. Alternatively, if the maximum probability value is a second value, it is determined that the luma in-loop filter network model is not used for the current block.

In another possible embodiment, in a case where the colour component type of the current block is the chroma component, the determining the at least two output values according to the preset selection network model of the current block may include the following operations.

An input reconstructed chroma picture block of the chroma in-loop filter network model is determined.

The input reconstructed chroma picture block is inputted into the chroma selection network model, to obtain the at least two chroma output values.

Herein, the at least two chroma output values include a first value corresponding to each of at least one candidate chroma in-loop filter network model when an chroma in-loop filter network model is used for the current block, and a second value when the chroma in-loop filter network model is not used for the current block.

Further, in some embodiments, taking the chroma output value being a probability value as an example, the method may further include: a maximum probability value is selected from the at least two chroma output values. If the maximum probability value is the first value, it can be determined that the chroma in-loop filter network model is used for the current block, and the candidate chroma in-loop filter network model corresponding to the maximum probability value is taken as the target chroma in-loop filter network model. Alternatively, if the maximum probability value is a second value, it is determined that the chroma in-loop filter network model is not used for the current block.

Thus, after the target in-loop filter network model (including the target luma in-loop filter network model or the target chroma in-loop filter network model) used for the current block is determined, the current block can be filtered using the selected target in-loop filter network model. Specifically, in a possible embodiment, when the in-loop filter network model is used for the current block, the filtering the current block using the target in-loop filter network model, to obtain the first reconstructed picture block of the current block may include the following operations.

A second reconstructed picture block of the current block is determined.

The second reconstructed picture block is inputted into the target in-loop filter network model, to obtain the first reconstructed picture block of the current block.

In another possible embodiment, when the in-loop filter network model is not used for the current block, the method may further include: the second reconstructed picture block is determined as the first reconstructed picture block of the current block.

In short, after the at least two output values are determined, if a maximum value determined from the at least two output values is the second value, it means that a rate-distortion cost when the in-loop filter network model is not used for the current block is minimal, then it can be determined that the in-loop filter network model is not used for the current block, that is, the second reconstructed picture block is directly determined as the first reconstructed picture block of the current block. If the maximum value determined from the at least two output values is one of the first values, it means that that the rate-distortion cost when the in-loop filter network model is used for the current block is minimal, then a candidate in-loop filter network model corresponding to the first value can be determined as the target in-loop filter network model, and then the second reconstructed picture block is inputted into the target in-loop filter network model, to obtain the first reconstructed picture block of the current block.

In some embodiments, with respect to the second reconstructed picture block (including the input reconstructed luma picture block or the input reconstructed chroma picture block), the second reconstructed picture block may be obtained by filtering via a deblocking filter and a sample adaptive offset filter.

It should further be noted that the in-loop filter network model described in the embodiment of the present disclosure can be a CNNLF model. Thus, the selected CNNLF model is used to perform CNNLF filtering processing on the current block, and the first reconstructed picture block of the current block can be obtained.

Furthermore, in some embodiments, the method may further include: the first reconstructed picture block is filtered using an adaptive loop filter after the first reconstructed picture block is determined.

Taking FIG. 10 as an example, the second reconstructed picture block is obtained by filtering via a DBF and an SAO filter, and then the first reconstructed picture block obtained by the second reconstructed picture block passes through a model adaptive selection module and a CNNLF model can be further inputted to an ALF for further filtering processing.

In addition, in order to reduce the complexity, in some embodiments, after the target in-loop filter network model used for the current block is determined, the method may further include the following operations.

Identification information of the in-loop filter network model is determined.

The identification information of the in-loop filter network model is encoded, and encoded bits are signalled.

In a specific example, the determining the identification information of the in-loop filter network model may include:
in response to the in-loop filter network model being used for the current block, an in-loop filter network model index number corresponding to the target in-loop filter network model is determined as the identification information of the in-loop filter network model; and/or
in response to the in-loop filter network model being not used for the current block, model disabling information is determined as the identification information of the in-loop filter network model.

Thus, taking the CNNLF model as an example, according to the model adaptive decision module at the encoder side, if the in-loop filter network model is used for the current block, the in-loop filter network model index number corresponding to the target in-loop filter network model can be determined as the identification information of the in-loop filter network model; If the in-loop filter network model is not used for the current block, the model disabling information can be determined as the identification information of the in-loop filter network model; Then the identification information of the in-loop filter network model is encoded and signalled; Thus, a case where the in-loop filter network model is not used for the current block or the in-loop filter network model index number used by the current block can be directly determined in the decoder according to the identification information of the in-loop filter network model obtained by decoding, thereby reducing the complexity of the decoder.

In the embodiment of the present disclosure, with respect to the first neural network structure, the second neural network structure, the third neural network structure and the like in the foregoing embodiments, a number of convolution layers, a number of fully connected layers, the nonlinear activation function and the like included in the first neural network structure, the second neural network structure and the third neural network structure can be adjusted. In addition, the in-loop filter network model targeted by the model adaptive selection module can be used for other efficient neural network filter models, in addition to the CNNLF model, to perform the model adaptive decision, which is not limited in the embodiments of the present disclosure.

In short, the embodiment of the present disclosure provides a deep learning based model adaptive decision module, which is used to perform adaptive on the use of the CNNLF model, so that it is no longer necessary to calculate the rate-distortion cost and transmit enable/disable information (such as picture-level enable/disable information and CTU-level enable/disable information), thereby avoiding additional bit overheads and improving coding performance. The model adaptive decision module can be regarded as a preset selection network model composed of a multi-layer convolution neural network and a multi-layer fully connected neural network. An input of the model adaptive decision module is the second reconstructed picture block of the current block (i.e., the input reconstructed picture block of the CNNLF model), and an output of the model adaptive decision module is probability distribution conditions of each CNNLF model and the decision of disabling the CNNLF model. The position of the model adaptive decision module in the encoder/decoder is shown in FIG. 5. The use of the model adaptive selection module does not depend on flag bits of the DBF, the SAO filter, the ALF and the CNNLF, only the position of the model adaptive selection module is set before the CNNLF.

In a specific example, the technical solution of the embodiments of the disclosure acts on the in-loop filter module of the decoder, and the specific flow is as follows.

The decoder acquires a bitstream and parses the bitstream, and when the parsing proceeds to the in-loop filter module, a process is performed according to a preset filter order. Herein, the preset filter order is DBF→SAO filter→model adaptive decision module→CNNLF→ALF. When the process arrives at the model adaptive decision module, following steps are performed.
(a) Firstly, whether the model adaptive decision module is enabled to be used to perform a model decision for a current block is determined according to the model_adaptive_decision_enable_flag obtained by decoding. If the model_adaptive_decision_enable_flag is "1", the model adaptive decision module is used to process the current block and the process proceeds to (b); if the model_adaptive_decision_enable_flag is "0", the process proceeds to (e).
(b) The colour component type of the current block is determined, and if the current block is a luma block, the process proceeds to (c); if the current block is a chroma block, the process proceeds to (d).
(c) For the luma component, the input reconstructed luma picture block of the CNNLF model is used as the input of the model adaptive decision module, and the output of the model adaptive decision module is the probability distribution conditions of each luma CNNLF model and a decision of disabling the luma CNNLF model. If the maximum output probability value corresponds to the decision of disabling the luma CNNLF model, the process proceeds to (e); if the maximum output probability value is an index serial number of a certain luma CNNLF model, the model is selected to perform CNNLF filtering processing on the current luma picture block, to obtain the finally output reconstructed luma picture block.
(d) For the chroma component, the input reconstructed chroma picture block of the CNNLF model is used as the input of the model adaptive decision module, and the output of the model adaptive decision module is the probability distribution conditions of each chroma CNNLF model and a decision of disabling the chroma CNNLF model. If the maximum output probability value corresponds to the decision of disabling the chroma CNNLF model, the process proceeds to (e); if the maximum output probability value is an index serial number of a certain chroma CNNLF model, the model is selected to perform CNNLF filtering processing on the current chroma picture block, to obtain the finally output reconstructed chroma picture block.
(e) If the processing of the current picture by the model adaptive decision module has completed, a next picture is loaded for processing, and then the process proceeds to (a).

In an implementation, modifications to syntax elements are as follows. For the definition of a sequence header, a modification to its syntax element is as shown in Table 1 above. For the definition of an intra prediction picture header, a modification to its syntax element is as shown in Table 2 above. For the definition of an inter prediction picture header, a modification to its syntax element is as shown in Table 3 above. For the definition of a patc, a modification to its syntax element is as shown in Table 4 above.

The embodiment of the present disclosure provides an encoding method, applied to an encoder. A value of first syntax element identification information is determined; when the first syntax element identification information indicates that a preset selection network model is enabled to be used to perform a model decision for a current block, at least two output values are determined according to the preset selection network model of the current block, where the at least two output values include a first value corresponding to each of at least one candidate in-loop filter network model when an in-loop filter network model is used for the current block, and a second value when the in-loop filter network model is not used for the current block; a target in-loop filter network model is determined according to the at least two output values when the in-loop filter network model is used for the current block, or it is determined according to the at least two output values that the in-loop filter network model is not used for the current block; and when the in-loop filter network model is used for the current block, the current block is filtered by using the target in-loop filter network model, to obtain a first reconstructed picture block of the current block. In such a manner, by introducing a neural network technology based on deep learning to perform adaptive decision on the in-loop filter network model, a target in-loop filter network model when the in-loop filter network model is used for the current block is determined or it is determined that the in-loop filter network model is not used for the current block; when the in-loop filter network model is used for the current block, the target in-loop filter network model can further be used to filter the current block, so that not only the complexity can be reduced, but also additional bit overheads can be avoided, thereby the coding performance can be improved, and then the encoding and decoding efficiency can be improved. In addition, a first reconstructed picture block finally outputted can be more closer to an original picture block, so that video picture quality can be improved.

Figure 13:
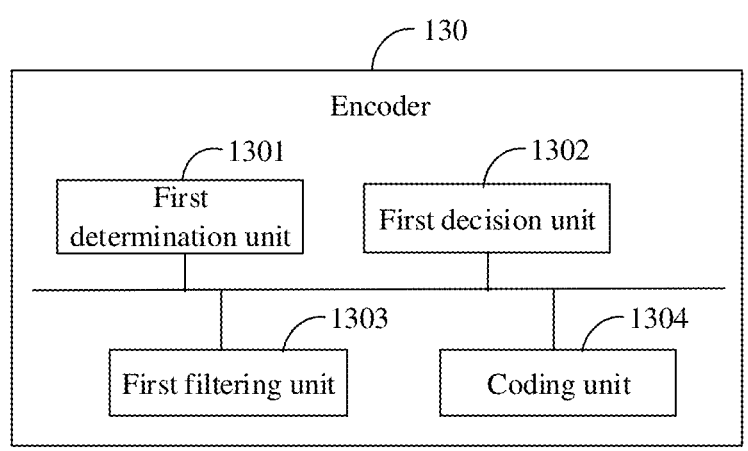
FIG. 13 is a composition structure schematic diagram of an encoder provided by an embodiment of the present disclosure.

In yet another embodiment of the present disclosure, based on the same inventive concept as the previous embodiments, referring to FIG. 13, a composition structure schematic diagram of an encoder 130 provided by the embodiment of the present disclosure is shown. As shown in FIG. 13, the encoder 130 can include a first determination unit 1301, a first decision unit 1302 and a first filtering unit 1303.

The first determination unit 1301 is configured to determine a value of first syntax element identification information.

The first decision unit 1302 is configured to determine, when the first syntax element identification information indicates that a preset selection network model is enabled to be used to perform a model decision for a current block, at least two output values according to the preset selection network model of the current block, where the at least two output values includes a first value corresponding to each of at least one candidate in-loop filter network model when an in-loop filter network model is used for the current block, and a second value when the in-loop filter network model is not used for the current block; and determine, according to the at least two output values, a target in-loop filter network model when the in-loop filter network model is used for the current block, or determine according to the at least two output values that the in-loop filter network model is not used for the current block.

The first filtering unit 1303 is configured to filter, when the in-loop filter network model is used for the current block, the current block using the target in-loop filter network model, to obtain a first reconstructed picture block of the current block.

In some embodiments, the first determination unit 1301 is further configured to determine a second reconstructed picture block of the current block.

The first filtering unit 1303 is further configured to input the second reconstructed picture block into the target in-loop filter network model, to obtain the first reconstructed picture block of the current block.

In some embodiments, the first filtering unit 1303 is further configured to determine the second reconstructed picture block as the first reconstructed picture block of the current block.

In some embodiments, the first decision unit 1302 is further configured to determine a target value from the at least two output values, determine that the in-loop filter network model is used for the current block in response to the target value being the first value, and take a candidate in-loop filter network model corresponding to the target value as the target in-loop filter network model, or determine that the in-loop filter network model is not used for the current block in response to the target value being the second value.

In some embodiments, the first decision unit 1302 is further configured to select from the at least two output values a maximum value as the target value.

In some embodiments, the first determination unit 1301 is further configured to determine that the value of the first syntax element identification information is a first identification value in response to the preset selection network model being enabled to be used to perform the model decision for the current block, and/or determine that the value of the first syntax element identification information is a second identification value in response to the preset selection network model being not enabled to be used to perform the model decision for the current block.

In some embodiments, referring to FIG. 13, the encoder further include a coding unit 1304, and the coding unit 1304 is configured to encode the value of the first syntax element identification information, and signal encoded bits.

In some embodiments, the first determination unit 1301 is further configured to determine a luma selection network model of the current block in response to a colour component type of the current block being a luma component, or determine a chroma selection network model of the current block in response to the colour component type of the current block being a chroma component.

Accordingly, the first decision unit 1302 is further configured to determine at least two luma output values according to the luma selection network model in response to the colour component type of the current block being the luma component, where the at least two luma output values include a first value corresponding to each of at least one candidate luma in-loop filter network model when the luma in-loop filter network model is used for the current block, and a second value when the luma in-loop filter network model is not used for the current block; or determine at least two chroma output values according to the chroma selection network model in response to the colour component type of the current block being the chroma component, where the at least two chroma output values include a first value corresponding to each of at least one candidate chroma in-loop filter network model when the chroma in-loop filter network model is used for the current block, and a second value when the chroma in-loop filter network model is not used for the current block.

In some embodiments, the first determination unit 1301 is further configured to in a case where the colour component type of the current block is the luma component, determine a first luma selection network model of the current block in response to a picture type of a picture to which the current block belongs being a first type; or determine a second luma selection network model of the current block in response to the picture type of the picture to which the current block belongs being a second type.

Accordingly, the first decision unit 1302 is further configured to determine the at least two luma output values according to the first luma selection network model in response to the picture type of the picture to which the current block belongs being the first type, where the at least two luma output values include a first value corresponding to each of at least one candidate first luma in-loop filter network model when the first luma in-loop filter network model is used for the current block, and a second value when the first luma in-loop filter network model is not used for the current block; or determine the at least two luma output values according to the second luma selection network model in response to the picture type of the picture to which the current block belongs being the second type, where the at least two luma output values include a first value corresponding to each of at least one candidate second luma in-loop filter network model when the second luma in-loop filter network model is used for the current block, and a second value when the second luma in-loop filter network model is not used for the current block.

In some embodiments, the at least one candidate first luma in-loop filter network model and the at least one candidate second luma in-loop filter network model are determined by training a first neural network structure based on at least one training sample, and the at least one candidate first luma in-loop filter network model and the at least one candidate second luma in-loop filter network model have corresponding relationships with picture types, colour component types and quantization parameters.

In some embodiments, the first neural network structure includes a first convolution module, a first residual module, a second convolution module and a first connection module sequentially connected, and the first connection module is further connected to an input of the first convolution module.

In some embodiments, the first convolution module is composed of one convolution layer and one activation layer, the second convolution module is composed of two convolution layers and one activation layer, the connection module is composed of a skip connection layer, the first residual module includes multiple residual blocks, and the residual block is composed of two convolution layers and one activation layer.

In some embodiments, the first determination unit 1301 is further configured to in a case where the colour component type of the current block is the chroma component, determine a first chroma selection network model of the current block in response to a picture type of a picture to which the current block belongs being a first type; or determine a second chroma selection network model of the current block in response to the picture type of the picture to which the current block belongs being a second type.

Accordingly, the first decision unit 1302 is further configured to determine the at least two chroma output values according to the first chroma selection network model in response to the picture type of the picture to which the current block belongs being the first type, where the at least two chroma output values include a first value corresponding to each of at least one candidate first chroma in-loop filter network model when the first chroma in-loop filter network model is used for the current block, and a second value when the first chroma in-loop filter network model is not used for the current block; or determine the at least two chroma output values according to the second chroma selection network model in response to the picture type of the picture to which the current block belongs being the second type, where the at least two chroma output values include a first value corresponding to each of at least one candidate second chroma in-loop filter network model when the second chroma in-loop filter network model is used for the current block, and a second value when the second chroma in-loop filter network model is not used for the current block.

In some embodiments, the at least one candidate first chroma in-loop filter network model and the at least one candidate second chroma in-loop filter network model are determined by training a second neural network structure based on at least one training sample, and the at least one candidate first chroma in-loop filter network model and the at least one candidate second chroma in-loop filter network model have corresponding relationships with picture types, colour component types and quantization parameters.

In some embodiments, the second neural network structure includes an up-sampling module, a third convolution module, a fourth convolution module, a fusion module, a second residual module, a fifth convolution module and a second connection module, the up-sampling module is connected to the third convolution module, the third convolution module and the fourth convolution module are connected to the fusion module, the fusion module, the second residual module, the fifth convolution module and the second connection module are sequentially connected, and the second connection module is further connected to an input of the up-sampling module.

In some embodiments, the third convolution module is composed of one convolution layer and one activation layer, the fourth convolution module is composed of one convolution layer and one activation layer, the fifth convolution module is composed of two convolution layers, one activation layer and one pooling layer, the connection module is composed of a skip connection layer, the second residual module includes multiple residual blocks, and the residual block is composed of two convolution layers and one activation layer.

In some embodiments, the first determination unit 1301 is further configured to in a case where the colour component type of the current block is the luma component, determine at least one candidate luma selection network model, where the candidate luma selection network model includes a candidate first luma in-loop filter network model and/or a candidate second luma in-loop filter network model; determine the picture type of the picture to which the current block belongs and quantization parameters of the current block; in response to the picture type being the first type, determine at least one candidate first luma selection network model corresponding to the first type from the at least one candidate luma selection network model, and determine, according to the quantization parameters, the first luma selection network model of the current block from the at least one candidate first luma selection network model; or in response to the picture type being the second type, determine at least one candidate second luma selection network model corresponding to the second type from the at least one candidate luma selection network model, and determine, according to the quantization parameters, the second luma selection network model of the current block from the at least one candidate second luma selection network model.

In some embodiments, the first determination unit 1301 is further configured to in a case where the colour component type of the current block is the chroma component, determine at least one candidate chroma selection network model, where the candidate chroma selection network model includes a candidate first chroma in-loop filter network model and/or a candidate second chroma in-loop filter network model; determine the picture type of the picture to which the current block belongs and quantization parameters of the current block; and in response to the picture type being the first type, determine at least one candidate first chroma selection network model corresponding to the first type from the at least one candidate chroma selection network model, and determine, according to the quantization parameters, the first chroma selection network model of the current block from the at least one candidate first chroma selection network model; or in response to the picture type being the second type, determine at least one candidate second chroma selection network model corresponding to the second type from the at least one candidate chroma selection network model, and determine, according to the quantization parameters, the second chroma selection network model of the current block from the at least one candidate second chroma selection network model.

In some embodiments, the at least one candidate luma in-loop filter network model is determined by training a third neural network structure based on at least one training sample, and the at least one candidate luma in-loop filter network model has corresponding relationship with picture types, colour component types and quantization parameters.

In some embodiments, the at least one candidate chroma in-loop filter network model is determined by training the third neural network structure based on at least one training sample, and the at least one candidate chroma in-loop filter network model has corresponding relationship with the picture types, the colour component types and the quantization parameters.

In some embodiments, the third neural network structure includes a sixth convolution module and a fully connected module sequentially connected, the sixth convolution module includes multiple convolution sub-modules, and the convolution sub-module is composed of one convolution layer and one pooling layer; the fully connected module includes multiple fully connected sub-modules, and the fully connected sub-module is composed of one fully connected layer and one activation layer.

In some embodiments, the first determination unit 1301 is further configured to determine identification information of the in-loop filter network model.

The coding unit 1304 is further configured to encode the identification information of the in-loop filter network model, and signal encoded bits.

In some embodiments, the first determination unit 1301 is further configured to in response to the in-loop filter network model being used for the current block, determine an in-loop filter network model index number corresponding to the target in-loop filter network model as the identification information of the in-loop filter network model; and/or in response to the in-loop filter network model being not used for the current block, determine model disabling information as the identification information of the in-loop filter network model.

In some embodiments, the in-loop filter network model is a Convolutional Neural Network based in-Loop Filter (CNNLF) model.

In some embodiments, the first decision unit 1302 is further configured to determine a second reconstructed picture block of the current block and input the second reconstructed picture block into the preset selection network model, to obtain the at least two output values.

In some embodiments, the second reconstructed picture block is obtained by filtering via a deblocking filter and a sample adaptive offset filter.

In some embodiments, the first filtering unit 1303 is further configured to filter the first reconstructed picture block using an adaptive loop filter after determining the first reconstructed picture block.

It should be understood that in the embodiment of the present disclosure, "unit" may be part of a circuit, part of a processor, part of a program or software, etc., of course it may also be a module or non-modular. Moreover, each component in the present embodiment may be integrated in one processing unit, each unit may exist physically alone, or two or more units may be integrated in one unit. The integrated unit can be realized either in a form of hardware or in a form of software function module.

If the integrated unit is implemented in the form of software function module rather than being sold or used as a stand-alone product, it may be stored in a computer readable storage medium. Based on such a understanding, the technical solution of the present embodiment, in essence or in part contributing to the prior art, or in whole or in part of the technical solution, may be embodied in a form of a software product, the software product is stored in a storage medium, and includes instructions for causing a computer device (which may be a personal computer, a server, or a network device, etc.) or a processor to perform all of or part of the steps of the method of the present embodiment. The aforementioned storage medium includes a USB flash disk, a removable hard disk, a Read Only Memory (ROM), a Random Access Memory (RAM), a magnetic disk or an optical disk and other medium capable of storing program codes.

Thus, an embodiment of the present disclosure provides a computer storage medium storing computer programs, applied to the encoder 130, the computer programs are used to implement the method of any of the preceding embodiments when executed by a first processor.

Figure 14:
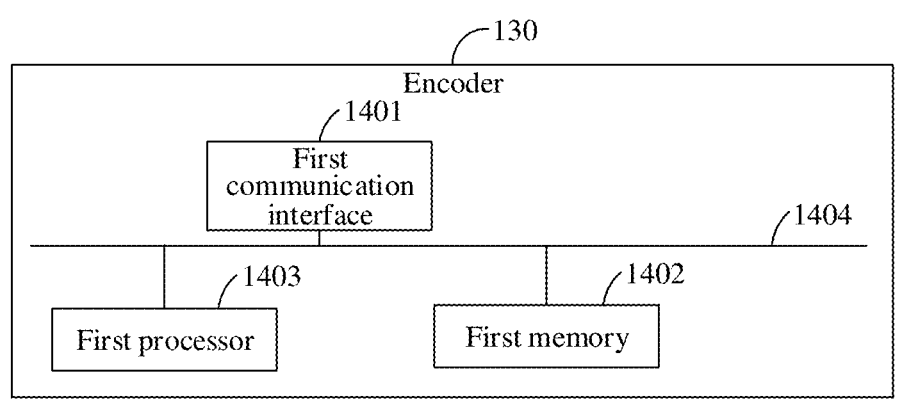
FIG. 14 is a specific hardware structure schematic diagram of an encoder provided by an embodiment of the present disclosure.

Based on the above-described composition of the encoder 130 and the computer storage medium, referring to FIG. 14, a specific hardware structure schematic diagram of an encoder 130 provided by the embodiment of the present disclosure is shown. As shown in FIG. 14, it may include a first communication interface 1401, a first memory 1402 and a first processor 1403. All components are coupled together by a first bus system 1404. It can be understood that the first bus system 1404 is used to implement connection communications between these components. The first bus system 1404 includes a power bus, a control bus and a status signal bus in addition to a data bus. However, the various buses are designated as the first bus system 1404 in FIG. 14 for clarity.

The first communication interface 1401 is used to receive and transmit signals in the process of transmitting and receiving information with other external network elements.

The first memory 1402 is used to store computer programs capable of running on the first processor 1403.

The first processor 1403 is used to, when running the computer programs, perform operations of:

determining a value of first syntax element identification information;

determining, when the first syntax element identification information indicates that a preset selection network model is enabled to be used to perform a model decision for a current block, at least two output values according to the preset selection network model of the current block, where the at least two output values includes a first value corresponding to each of at least one candidate in-loop filter network model when an in-loop filter network model is used for the current block, and a second value when the in-loop filter network model is not used for the current block;

determining, according to the at least two output values, a target in-loop filter network model when the in-loop filter network model is used for the current block, or determining according to the at least two output values that the in-loop filter network model is not used for the current block; and filtering the current block using the target in-loop filter network model, to obtain the first reconstructed picture block of the current block.

It can be understood that the first memory 1402 in the embodiments of the present disclosure may be a volatile memory or a non-volatile memory, or may include both the volatile memory and the non-volatile memory. The non-volatile memory can be a read-only memory (ROM), a programmable ROM (PROM), an erasable PROM (EPROM), an electrically EPROM (EEPROM) or a flash memory. The volatile memory can be a random access memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The first memory 1402 of the systems and methods described herein is intended to include, but is not limited to, memories of these and any other suitable type.

The first processor 1403 may be an integrated circuit chip with signal processing capability. In the implementation process, various operations in the above method can be implemented by an integrated logic circuit of hardware in the processor or instructions in the form of software. The above mentioned first processor 1403 can be a general purpose processor, a digital signal processor (DSPS), an application specific integrated circuit (ASIC), a field programmable gate array (FPGA) or other programmable logic devices, discrete gates or transistor logic devices, and discrete hardware components. Various methods, operations and logic block diagrams disclosed in the embodiments of the present disclosure can be implemented or executed. The general-purpose processor may be a microprocessor or the processor may be any conventional processor or the like. The operations of the methods disclosed in connection with the embodiments of the present disclosure can be directly embodied as being implemented by a hardware decoding processor, or by a combination of the hardware and software modules in the decoding processor. The software module can be located in a random memory, a flash memory, a read-only memory, a programmable read-only memory or an electrically erasable programmable memory, a register and other mature storage media in the art. The storage medium is located in the first memory 1402, and the first processor 1403 reads information in the first memory 1402 and implements the operations of the above methods in combination with its hardware.

It can be understood that the embodiments described herein may be implemented in a hardware, a software, a firmware, a middleware, a microcode or a combination thereof. For a hardware implementation, the processing unit may be implemented in one or more ASICs, DSPs, DSP devices (DSPDs), Programmable Logic Devices (PLDs), FPGAs, general purpose processors, controllers, microcontrollers, microprocessors, other electronic units for performing the functions described herein, or combinations thereof. For a software implementation, the techniques described herein may be implemented by modules (e.g. procedures, functions, etc.) that perform the functions described herein. The software code may be stored in a memory and executed by a processor. The memory can be implemented inside the processor or outside the processor.

Optionally, as another embodiment, the first processor 1403 is further configured to perform the method of any of the aforementioned embodiments when running the computer programs.

The embodiment provides an encoder, and the encoder may include a first determination unit, a first decision unit and a first filtering unit. In this way, by introducing a neural network technology based on deep learning to perform adaptive decision on the in-loop filter network model, it can not only reduce the complexity, but also avoid additional bit overheads, thereby the coding performance can be improved, and then the encoding and decoding efficiency can be improved. In addition, a first reconstructed picture block finally outputted can be more closer to an original picture block, so that video picture quality can be improved.

Figure 15:
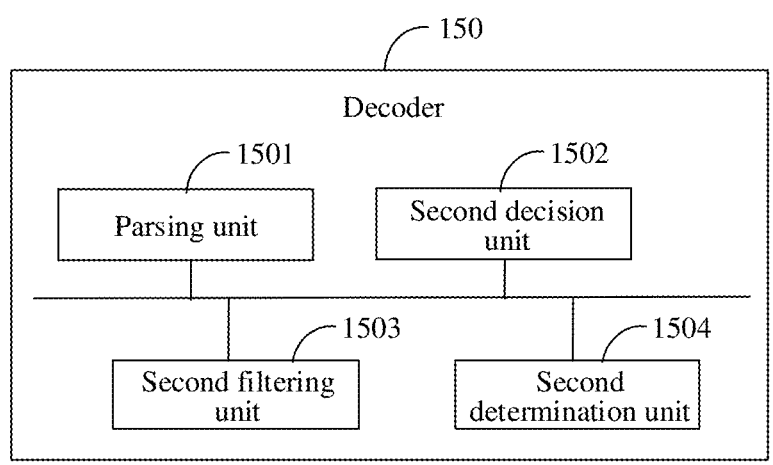
FIG. 15 is a composition structure schematic diagram of a decoder provided by an embodiment of the present disclosure.

In still another embodiment of the present disclosure, based on the same inventive concept as the previous embodiments, referring to FIG. 15, a composition structure schematic diagram of a decoder 150 provided by the embodiment of the present disclosure is shown. As shown in FIG. 15, the decoder 150 can include a parsing unit 1501, a second decision unit 1502 and a second filtering unit 1503.

The parsing unit 1501 is configured to parse a bitstream to determine a value of first syntax element identification information.

The second decision unit 1502 is configured to determine, when the first syntax element identification information indicates that a preset selection network model is enabled to be used to perform a model decision for a current block, at least two output values according to the preset selection network model of the current block, where the at least two output values includes a first value corresponding to each of at least one candidate in-loop filter network model when an in-loop filter network model is used for the current block, and a second value when the in-loop filter network model is not used for the current block; and determine, according to the at least two output values, a target in-loop filter network model when the in-loop filter network model is used for the current block, or determine according to the at least two output values that the in-loop filter network model is not used for the current block.

The second filtering unit 1503 is configured to filter, when the in-loop filter network model is used for the current block, the current block using the target in-loop filter network model, to obtain a first reconstructed picture block of the current block.

In some embodiments, referring to FIG. 15, the decoder 150 further includes a second determination unit 1504, and the second determination unit 1504 is configured to determine a second reconstructed picture block of the current block.

The second filtering unit 1503 is further configured to input the second reconstructed picture block into the target in-loop filter network model, to obtain the first reconstructed picture block of the current block.

In some embodiments, the second filtering unit 1503 is further configured to determine the second reconstructed picture block as the first reconstructed picture block of the current block.

In some embodiments, the second decision unit 1502 is further configured to determine a target value from the at least two output values, determine that the in-loop filter network model is used for the current block in response to the target value being the first value, and take a candidate in-loop filter network model corresponding to the target value as the target in-loop filter network model, or determine that the in-loop filter network model is not used for the current block in response to the target value being the second value.

In some embodiments, the second decision unit 1502 is further configured to select from the at least two output values a maximum value as the target value.

In some embodiments, the second determination unit 1504 is further configured to in response to the value of the first syntax element identification information being a first identification value, determine that the first syntax element identification information indicates that the preset selection network model is enabled to be used to perform the model decision for the current block; or in response to the value of the first syntax element identification information being a second identification value, determine that the first syntax element identification information indicates that the preset selection network model is not enabled to be used to perform the model decision for the current block.

In some embodiments, the second determination unit 1504 is further configured to in response to a colour component type of the current block being a luma component, determine a luma selection network model of the current block; or in response to the colour component type of the current block being a chroma component, determine a chroma selection network model of the current block.

Accordingly, the second decision unit 1502 is further configured to determine at least two luma output values according to the luma selection network model in response to the colour component type of the current block being the luma component, where the at least two luma output values include a first value corresponding to each of at least one candidate luma in-loop filter network model when the luma in-loop filter network model is used for the current block, and a second value when the luma in-loop filter network model is not used for the current block; or determine at least two chroma output values according to the chroma selection network model in response to the colour component type of the current block being the chroma component, where the at least two chroma output values include a first value corresponding to each of at least one candidate chroma in-loop filter network model when the chroma in-loop filter network model is used for the current block, and a second value when the chroma in-loop filter network model is not used for the current block.

In some embodiments, the second determination unit 1504 is further configured to in a case where the colour component type of the current block is the luma component, determine a first luma selection network model of the current block in response to a picture type of a picture to which the current block belongs being a first type; or determine a second luma selection network model of the current block in response to the picture type of the picture to which the current block belongs being a second type.

Accordingly, the second decision unit 1502 is further configured to determine the at least two luma output values according to the first luma selection network model in response to the picture type of the picture to which the current block belongs being the first type, where the at least two luma output values include a first value corresponding to each of at least one candidate first luma in-loop filter network model when the first luma in-loop filter network model is used for the current block, and a second value when the first luma in-loop filter network model is not used for the current block; or determine the at least two luma output values according to the second luma selection network model in response to the picture type of the picture to which the current block belongs being the second type, where the at least two luma output values include a first value corresponding to each of at least one candidate second luma in-loop filter network model when the second luma in-loop filter network model is used for the current block, and a second value when the second luma in-loop filter network model is not used for the current block.

In some embodiments, the at least one candidate first luma in-loop filter network model and the at least one candidate second luma in-loop filter network model are determined by training a first neural network structure based on at least one training sample, and the at least one candidate first luma in-loop filter network model and the at least one candidate second luma in-loop filter network model have corresponding relationships with picture types, colour component types and quantization parameters.

In some embodiments, the first neural network structure includes a first convolution module, a first residual module, a second convolution module and a first connection module sequentially connected, and the first connection module is further connected to an input of the first convolution module.

In some embodiments, the first convolution module is composed of one convolution layer and one activation layer, the second convolution module is composed of two convolution layers and one activation layer, the connection module is composed of a skip connection layer, the first residual module includes multiple residual blocks, and the residual block is composed of two convolution layers and one activation layer.

In some embodiments, the second determination unit 1504 is further configured to in a case where the colour component type of the current block is the chroma component, determine a first chroma selection network model of the current block in response to a picture type of a picture to which the current block belongs being a first type; or determine a second chroma selection network model of the current block in response to the picture type of the picture to which the current block belongs being a second type.

Accordingly, the second decision unit 1502 is further configured to determine the at least two chroma output values according to the first chroma selection network model in response to the picture type of the picture to which the current block belongs being the first type, where the at least two chroma output values include a first value corresponding to each of at least one candidate first chroma in-loop filter network model when the first chroma in-loop filter network model is used for the current block, and a second value when the first chroma in-loop filter network model is not used for the current block; or determine the at least two chroma output values according to the second chroma selection network model in response to the picture type of the picture to which the current block belongs being the second type, where the at least two chroma output values include a first value corresponding to each of at least one candidate second chroma in-loop filter network model when the second chroma in-loop filter network model is used for the current block, and a second value when the second chroma in-loop filter network model is not used for the current block.

In some embodiments, the at least one candidate first chroma in-loop filter network model and the at least one candidate second chroma in-loop filter network model are determined by training a second neural network structure based on at least one training sample, and the at least one candidate first chroma in-loop filter network model and the at least one candidate second chroma in-loop filter network model have corresponding relationships with picture types, colour component types and quantization parameters.

In some embodiments, the second neural network structure includes an up-sampling module, a third convolution module, a fourth convolution module, a fusion module, a second residual module, a fifth convolution module and a second connection module, the up-sampling module is connected to the third convolution module, the third convolution module and the fourth convolution module are connected to the fusion module, the fusion module, the second residual module, the fifth convolution module and the second connection module are sequentially connected, and the second connection module is further connected to an input of the up-sampling module.

In some embodiments, the third convolution module is composed of one convolution layer and one activation layer, the fourth convolution module is composed of one convolution layer and one activation layer, the fifth convolution module is composed of two convolution layers, one activation layer and one pooling layer, the connection module is composed of a skip connection layer, the second residual module includes multiple residual blocks, and the residual block is composed of two convolution layers and one activation layer.

In some embodiments, the second determination unit 1504 is further configured to in a case where the colour component type of the current block is the luma component, determine at least one candidate luma selection network model, where the candidate luma selection network model includes a candidate first luma in-loop filter network model and/or a candidate second luma in-loop filter network model; determine the picture type of the picture to which the current block belongs and quantization parameters of the current block; in response to the picture type being the first type, determine at least one candidate first luma selection network model corresponding to the first type from the at least one candidate luma selection network model, and determine, according to the quantization parameters, the first luma selection network model of the current block from the at least one candidate first luma selection network model; or in response to the picture type being the second type, determine at least one candidate second luma selection network model corresponding to the second type from the at least one candidate luma selection network model, and determine, according to the quantization parameters, the second luma selection network model of the current block from the at least one candidate second luma selection network model.

In some embodiments, the second determination unit 1504 is further configured to in a case where the colour component type of the current block is the chroma component, determine at least one candidate chroma selection network model, and the candidate chroma selection network model includes the candidate first chroma in-loop filter network model and/or the candidate second chroma in-loop filter network model; determine the picture type of the picture to which the current block belongs and quantization parameters of the current block; and in response to the picture type being the first type, determine at least one candidate first chroma selection network model corresponding to the first type from the at least one candidate chroma selection network model, and determine, according to the quantization parameters, the first chroma selection network model of the current block from the at least one candidate first chroma selection network model; or in response to the picture type being the second type, determine at least one candidate second chroma selection network model corresponding to the second type from the at least one candidate chroma selection network model, and determine, according to the quantization parameters, the second chroma selection network model of the current block from the at least one candidate second chroma selection network model.

In some embodiments, the at least one candidate luma in-loop filter network model is determined by training a third neural network structure based on at least one training sample, and the at least one candidate luma in-loop filter network model has corresponding relationship with picture types, colour component types and quantization parameters.

In some embodiments, the at least one candidate chroma in-loop filter network model is determined by training the third neural network structure based on at least one training sample, and the at least one candidate chroma in-loop filter network model has corresponding relationship with the picture types, the colour component types and the quantization parameters.

In some embodiments, the third neural network structure includes a sixth convolution module and a fully connected module sequentially connected, the sixth convolution module includes multiple convolution sub-modules, and the convolution sub-module is composed of one convolution layer and one pooling layer; the fully connected module includes multiple fully connected sub-modules, and the fully connected sub-module is composed of one fully connected layer and one activation layer.

In some embodiments, the parsing unit 1501 is further configured to when the first syntax element identification information indicates that the preset selection network model is enabled to be used to perform the model decision for the current block, parse the bitstream to determine identification information of the in-loop filter network model.

The second determination unit 1504 is further configured to in response to the identification information of the in-loop filter network model being model disabling information, determine that the in-loop filter network model is not used for the current block; or in response to the identification information of the in-loop filter network model being an in-loop filter network model index number, determine, according to the in-loop filter network model index number, the target in-loop filter network model used for the current block from the at least one candidate in-loop filter network model.

The second filtering unit 1503 is further configured to filter the current block using the target in-loop filter network model, to obtain the first reconstructed picture block of the current block.

In some embodiments, the in-loop filter network model is a Convolutional Neural Network based in-Loop Filter (CNNLF) model.

In some embodiments, the second determination unit 1504 is further configured to determine a second reconstructed picture block of the current block.

The second decision unit 1502 is further configured to input the second reconstructed picture block into the preset selection network model, to obtain the at least two output values.

In some embodiments, the second reconstructed picture block is obtained by filtering via a deblocking filter and a sample adaptive offset filter.

In some embodiments, the second filtering unit 1503 is further configured to filter the first reconstructed picture block using an adaptive loop filter after determining the first reconstructed picture block.

It should be understood that in the embodiment of the present disclosure, "unit" may be part of a circuit, part of a processor, part of a program or software, etc., of course it may also be a module or non-modular. Moreover, each component in the present embodiment may be integrated in one processing unit, each unit may exist physically alone, or two or more units may be integrated in one unit. The integrated unit can be realized either in a form of hardware or in a form of software function module.

If the integrated unit is implemented in the form of software function module rather than being sold or used as a stand-alone product, it may be stored in a computer readable storage medium. Based on such a understanding, an embodiment of the present disclosure provides a computer storage medium storing computer programs, applied to the decoder 150, the computer programs are used to implement the method of any of the preceding embodiments when executed by a second processor.

Figure 16:
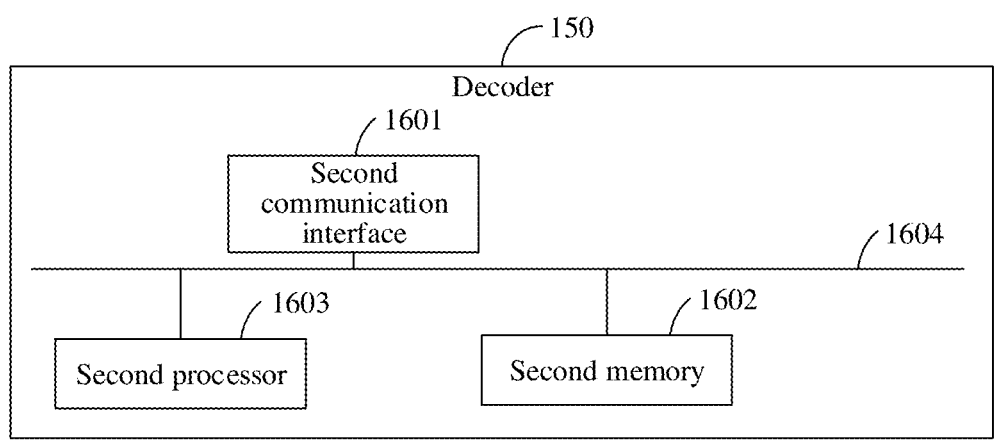
FIG. 16 is a specific hardware structure schematic diagram of a decoder provided by an embodiment of the present disclosure.

Based on the above-described composition of the decoder 150 and the computer storage medium, referring to FIG. 16, a specific hardware structure schematic diagram of a decoder 150 provided by an embodiment of the present disclosure is shown. As shown in FIG. 16, it may include a second communication interface 1601, a second memory 1602 and a second processor 1603. All components are coupled together by a second bus system 1604. It can be understood that the second bus system 1604 is used to implement connection communications between these components. The second bus system 1604 includes a power bus, a control bus and a status signal bus in addition to a data bus. However, the various buses are designated as the second bus system 1604 in FIG. 16 for clarity.

The second communication interface 1601 is used to receive and transmit signals in the process of transmitting and receiving information with other external network elements.

The second memory 1602 is used to store computer programs capable of running on the second processor 1603.

The second processor 1603 is used to, when running the computer programs, perform operations of:

parsing a bitstream, and determining a value of first syntax element identification information;

determining, when the first syntax element identification information indicates that a preset selection network model is enabled to be used to perform a model decision for a current block, at least two output values according to the preset selection network model of the current block, where the at least two output values includes a first value corresponding to each of at least one candidate in-loop filter network model when an in-loop filter network model is used for the current block, and a second value when the in-loop filter network model is not used for the current block;

determining, according to the at least two output values, a target in-loop filter network model when the in-loop filter network model is used for the current block, or determining according to the at least two output values that the in-loop filter network model is not used for the current block; and filtering the current block using the target in-loop filter network model, to obtain the first reconstructed picture block of the current block.

Optionally, as another embodiment, the second processor 1603 is further configured to perform the method of any of the aforementioned embodiments when running the computer programs.

It will be understood that the second memory 1602 is similar in hardware function to the first memory 1402 and the second processor 1603 is similar in hardware function to the first processor 1403, which will not be described in details herein.

The embodiment provides a decoder, and the decoder may include a parsing unit, a second decision unit and a second filtering unit. In this way, by introducing a neural network technology based on deep learning to perform adaptive decision on the in-loop filter network model, it can not only reduce the complexity, but also avoid additional bit overheads, thereby the coding performance can be improved, and then the encoding and decoding efficiency can be improved. In addition, a first reconstructed picture block finally outputted can be more closer to an original picture block, so that video picture quality can be improved.

Figure 17:
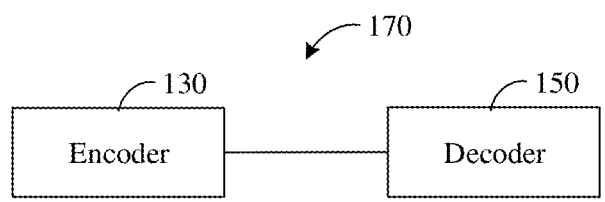
FIG. 17 is a composition structure schematic diagram of a codec system provided by an embodiment of the present disclosure.

In still another embodiment of the present disclosure, referring to FIG. 17, a composition structure schematic diagram of a codec system provided by an embodiment of the present disclosure is shown. As shown in FIG. 17, the codec system 170 may include an encoder 130 as described in any of the foregoing embodiments and a decoder 150 as described in any of the foregoing embodiments.

In some embodiments, the embodiments of the present disclosure further provides a bitstream, and the bitstream is generated by performing bit encoding according to information to be encoded, the information to be encoded includes a value of first syntax element identification information, and the first syntax element identification information is used for indicating whether or not a preset selection network model is enabled to be used to perform a model decision for a current block.

Furthermore, in some embodiments, the information to be encoded further includes identification information of an in-loop filter network model, and the identification information of the in-loop filter network model is used for determining an in-loop filter network model index number when the in-loop filter network model is used for the current block or determining that the in-loop filter network model is not used for the current block.

It should be noted that in the codec system 170, the encoder 130 can transmit the bitstream to the decoder 150. Thus, the decoder 150 can obtain the value of the first syntax element identification information by parsing the bitstream to determine whether or not the preset selection network model is enabled to be used to perform the model decision for the current block.

In such a manner, in the embodiment of the present disclosure, by introducing a neural network technology based on deep learning to perform adaptive decision on the in-loop filter network model, a target in-loop filter network model when the in-loop filter network model is used for the current block is determined or it is determined that the in-loop filter network model is not used for the current block; when the in-loop filter network model is used for the current block, the target in-loop filter network model can further be used to filter the current block, so that not only the complexity can be reduced, but also additional bit overheads can be avoided, thereby the coding performance can be improved, and then the encoding and decoding efficiency can be improved. In addition, a first reconstructed picture block finally outputted can be more closer to an original picture block, so that video picture quality can be improved.

It should be noted that, as used herein, the terms "including," "comprising," or any other variation thereof are intended to encompass non-exclusive inclusion, so that a process, a method, an object, or an apparatus comprising a set of elements includes not only those elements but also other elements not explicitly listed, or also includes elements inherent to such a process, a method, an object, or an apparatus. In the absence of further limitations, an element defined by the phrase "comprises an . . . " does not preclude the existence of another identical element in the process, the method, the object, or the apparatus including the element.

The above serial numbers of the embodiments of the present disclosure are for description only and do not represent advantages and disadvantages of the embodiments.

The methods disclosed in several method embodiments provided in the present disclosure can be arbitrarily combined without conflict, to obtain new method embodiments.

Features disclosed in several product embodiments provided in the present disclosure can be arbitrarily combined without conflict, to obtain new product embodiments.

Features disclosed in several method or device embodiments provided in the present disclosure can be arbitrarily combined without conflict, to obtain new method embodiments or device embodiments.

The above is only the specific embodiments of the present disclosure, but the scope of protection of the present disclosure is not limited to this. Any modifications and variations that can be easily known by the person skilled in the technical field within the scope of protection of the present disclosure shall be included in the scope of protection of the present disclosure. Therefore, the scope of protection of the present disclosure shall be subject to the scope of protection of the claims.

INDUSTRIAL APPLICABILITY

In the embodiments of the present disclosure, either an encoder or a decoder, after a value of first syntax element identification information is determined, when the first syntax element identification information indicates that a preset selection network model is enabled to be used to perform a model decision for a current block, at least two output values are determined according to the preset selection network model of the current block; the at least two output values include a first value corresponding to each of at least one candidate in-loop filter network model when an in-loop filter network model is used for the current block, and a second value when the in-loop filter network model is not used for the current block; a target in-loop filter network model is determined according to the at least two output values when the in-loop filter network model is used for the current block, or it is determined according to the at least two output values that the in-loop filter network model is not used for the current block; and when the in-loop filter network model is used for the current block, the current block is filtered by using the target in-loop filter network model, to obtain a first reconstructed picture block of the current block. In such a manner, by introducing a neural network technology based on deep learning to perform adaptive decision on the in-loop filter network model, a target in-loop filter network model when the in-loop filter network model is used for the current block is determined or it is determined that the in-loop filter network model is not used for the current block; when the in-loop filter network model is used for the current block, the target in-loop filter network model can further be used to filter the current block, so that not only the complexity can be reduced, but also additional bit overheads can be avoided, thereby the coding performance can be improved, and then the encoding and decoding efficiency can be improved. In addition, a first reconstructed picture block finally outputted can be more closer to an original picture block, so that video picture quality can be improved.

The invention claimed is:

1. A decoding method, applied to a decoder, comprising:
   parsing a bitstream to determine a value of first syntax element identification information;
   determining, when the first syntax element identification information indicates that a preset selection network model is enabled to be used to perform a model decision for a current block, at least two output values according to the preset selection network model of the current block, wherein the at least two output values comprise a first value corresponding to each of at least one candidate in-loop filter network model when an in-loop filter network model is used for the current block, and a second value when the in-loop filter network model is not used for the current block;
   determining, according to the at least two output values, a target in-loop filter network model when the in-loop filter network model is used for the current block, or determining according to the at least two output values that the in-loop filter network model is not used for the current block; and
   filtering, when the in-loop filter network model is used for the current block, the current block using the target in-loop filter network model, to obtain a first reconstructed picture block of the current block,
   wherein the determining, according to the at least two output values, the target in-loop filter network model when the in-loop filter network model is used for the current block, or determining according to the at least two output values that the in-loop filter network model is not used for the current block comprises:
   determining a target value from the at least two output values; and
   in response to the target value being the first value, determining that the in-loop filter network model is used for the current block, and taking a candidate in-loop filter network model corresponding to the target value as the target in-loop filter network model; or
   in response to the target value being the second value, determining that the in-loop filter network model is not used for the current block.

2. The method of claim 1, wherein when the in-loop filter network model is used for the current block, the filtering the current block using the target in-loop filter network model, to obtain the first reconstructed picture block of the current block comprises:
   determining a second reconstructed picture block of the current block; and inputting the second reconstructed picture block into the target in-loop filter network model, to obtain the first reconstructed picture block of the current block.

3. The method of claim 2, wherein when the in-loop filter network model is not used for the current block, the method further comprises:
determining the second reconstructed picture block as the first reconstructed picture block of the current block.

4. The method of claim 1, wherein the determining the target value from the at least two output values comprises:
selecting, from the at least two output values, a maximum value as the target value.

5. The method of claim 1, further comprising:
in response to the value of the first syntax element identification information being a first identification value, determining that the first syntax element identification information indicates that the preset selection network model is enabled to be used to perform the model decision for the current block; or
in response to the value of the first syntax element identification information being a second identification value, determining that the first syntax element identification information indicates that the preset selection network model is not enabled to be used to perform the model decision for the current block.

6. The method of claim 1, further comprising: in a case where a colour component type of the current block is a luma component, determining a luma selection network model of the current block,
wherein the determining the luma selection network model of the current block comprises:
determining at least one candidate luma selection network model, wherein the candidate luma selection network model comprises at least one of a candidate first luma in-loop filter network model or a candidate second luma in-loop filter network model;
determining a picture type of a picture to which the current block belongs and quantization parameters of the current block; and
in response to the picture type being a first type, determining at least one candidate first luma selection network model corresponding to the first type from the at least one candidate luma selection network model, and determining, according to the quantization parameters, a first luma selection network model of the current block from the at least one candidate first luma selection network model; or
in response to the picture type being a second type, determining at least one candidate second luma selection network model corresponding to the second type from the at least one candidate luma selection network model, and determining, according to the quantization parameters, a second luma selection network model of the current block from the at least one candidate second luma selection network model.

7. The method of claim 1, further comprising: in a case where a colour component type of the current block is a chroma component, determining a chroma selection network model of the current block,
wherein the determining the chroma selection network model of the current block comprises:
determining at least one candidate chroma selection network model, wherein the candidate chroma selection network model comprises at least one of a candidate first chroma in-loop filter network model or a candidate second chroma in-loop filter network model;
determining a picture type of a picture to which the current block belongs and quantization parameters of the current block; and
in response to the picture type being a first type, determining at least one candidate first chroma selection network model corresponding to the first type from the at least one candidate chroma selection network model, and determining, according to the quantization parameters, a first chroma selection network model of the current block from the at least one candidate first chroma selection network model; or
in response to the picture type being a second type, determining at least one candidate second chroma selection network model corresponding to the second type from the at least one candidate chroma selection network model, and determining, according to the quantization parameters, a second chroma selection network model of the current block from the at least one candidate second chroma selection network model.

8. The method of claim 1, further comprising:
when the first syntax element identification information indicates that the preset selection network model is enabled to be used to perform the model decision for the current block, parsing the bitstream to determine identification information of the in-loop filter network model;
in response to the identification information of the in-loop filter network model being model disabling information, determining that the in-loop filter network model is not used for the current block; or
in response to the identification information of the in-loop filter network model being an in-loop filter network model index number, determining, according to the in-loop filter network model index number, the target in-loop filter network model used for the current block from the at least one candidate in-loop filter network model; and
filtering the current block using the target in-loop filter network model, to obtain the first reconstructed picture block of the current block.

9. An encoding method, applied to an encoder, comprising:
determining a value of first syntax element identification information;
determining, when the first syntax element identification information indicates that a preset selection network model is enabled to be used to perform a model decision for a current block, at least two output values according to the preset selection network model of the current block, wherein the at least two output values comprises a first value corresponding to each of at least one candidate in-loop filter network model when an in-loop filter network model is used for the current block, and a second value when the in-loop filter network model is not used for the current block;
determining, according to the at least two output values, a target in-loop filter network model when the in-loop filter network model is used for the current block, or determining according to the at least two output values that the in-loop filter network model is not used for the current block; and
filtering, when the in-loop filter network model is used for the current block, the current block using the target in-loop filter network model, to obtain a first reconstructed picture block of the current block,
wherein the determining, according to the at least two output values, the target in-loop filter network model when the in-loop filter network model is used for the current block, or determining according to the at least two output values that the in-loop filter network model is not used for the current block comprises:
  determining a target value from the at least two output values; and
  in response to the target value being the first value, determining that the in-loop filter network model is used for the current block, and taking a candidate in-loop filter network model corresponding to the target value as the target in-loop filter network model; or
  in response to the target value being the second value, determining that the in-loop filter network model is not used for the current block.

10. The method of claim 9, wherein when the in-loop filter network model is used for the current block, the filtering the current block using the target in-loop filter network model, to obtain the first reconstructed picture block of the current block comprises:
  determining a second reconstructed picture block of the current block; and
  inputting the second reconstructed picture block into the target in-loop filter network model, to obtain the first reconstructed picture block of the current block.

11. The method of claim 10, wherein when the in-loop filter network model is not used for the current block, the method further comprises:
  determining the second reconstructed picture block as the first reconstructed picture block of the current block.

12. The method of claim 9, wherein the determining the target value from the at least two output values comprises:
  selecting, from the at least two output values, a maximum value as the target value.

13. The method of claim 9, wherein the determining the value of the first syntax element identification information comprises at least one of:
  in response to the preset selection network model being enabled to be used to perform the model decision for the current block, determining that the value of the first syntax element identification information is a first identification value; or
  in response to the preset selection network model being not enabled to be used to perform the model decision for the current block, determining that the value of the first syntax element identification information is a second identification value.

14. The method of claim 9, further comprising: in a case where a colour component type of the current block is a luma component, determining a luma selection network model of the current block,
  wherein the determining the luma selection network model of the current block comprises:
  determining at least one candidate luma selection network model, wherein the candidate luma selection network model comprises at least one of a candidate first luma in-loop filter network model or a candidate second luma in-loop filter network model;
  determining a picture type of a picture to which the current block belongs and quantization parameters of the current block; and
  in response to the picture type being a first type, determining at least one candidate first luma selection network model corresponding to the first type from the at least one candidate luma selection network model, and determining, according to the quantization parameters, a first luma selection network model of the current block from the at least one candidate first luma selection network model; or
  in response to the picture type being a second type, determining at least one candidate second luma selection network model corresponding to the second type from the at least one candidate luma selection network model, and determining, according to the quantization parameters, a second luma selection network model of the current block from the at least one candidate second luma selection network model.

15. The method of claim 9, further comprising: in a case where a colour component type of the current block is a chroma component, determining a chroma selection network model of the current block,
  wherein the determining the chroma selection network model of the current block comprises:
  determining at least one candidate chroma selection network model, wherein the candidate chroma selection network model comprises at least one of a candidate first chroma in-loop filter network model or a candidate second chroma in-loop filter network model;
  determining a picture type of a picture to which the current block belongs and quantization parameters of the current block; and
  in response to the picture type being a first type, determining at least one candidate first chroma selection network model corresponding to the first type from the at least one candidate chroma selection network model, and determining, according to the quantization parameters, a first chroma selection network model of the current block from the at least one candidate first chroma selection network model; or
  in response to the picture type being a second type, determining at least one candidate second chroma selection network model corresponding to the second type from the at least one candidate chroma selection network model, and determining, according to the quantization parameters, a second chroma selection network model of the current block from the at least one candidate second chroma selection network model.

16. The method of claim 9, further comprising:
  determining identification information of the in-loop filter network model; and
  encoding the identification information of the in-loop filter network model, and signalling encoded bits,
  wherein the determining the identification information of the in-loop filter network model comprises at least one of:
  in response to the in-loop filter network model being used for the current block, determining an in-loop filter network model index number corresponding to the target in-loop filter network model as the identification information of the in-loop filter network model; or
  in response to the in-loop filter network model being not used for the current block, determining model disabling information as the identification information of the in-loop filter network model.

17. An encoder, comprising a first memory and a first processor, wherein
  the first memory is configured to store computer programs capable of running on the first processor; and
  the first processor is configured to perform operations comprising:
  determining a value of first syntax element identification information;

determining, when the first syntax element identification information indicates that a preset selection network model is enabled to be used to perform a model decision for a current block, at least two output values according to the preset selection network model of the current block, wherein the at least two output values comprises a first value corresponding to each of at least one candidate in-loop filter network model when an in-loop filter network model is used for the current block, and a second value when the in-loop filter network model is not used for the current block;

determining, according to the at least two output values, a target in-loop filter network model when the in-loop filter network model is used for the current block, or determining according to the at least two output values that the in-loop filter network model is not used for the current block; and filtering, when the in-loop filter network model is used for the current block, the current block using the target in-loop filter network model, to obtain a first reconstructed picture block of the current block, wherein the determining, according to the at least two output values, the target in-loop filter network model when the in-loop filter network model is used for the current block, or determining according to the at least two output values that the in-loop filter network model is not used for the current block comprises:

determining a target value from the at least two output values; and in response to the target value being the first value, determining that the in-loop filter network model is used for the current block, and taking a candidate in-loop filter network model corresponding to the target value as the target in-loop filter network model; or in response to the target value being the second value, determining that the in-loop filter network model is not used for the current block.

18. A decoder, comprising: a processor; and a memory for storing computer-executable instructions, wherein the processor is configured to invoke and run the computer-executable instructions stored in the memory, to perform operations of:

parsing a bitstream to determine a value of first syntax element identification information;

determining, when the first syntax element identification information indicates that a preset selection network model is enabled to be used to perform a model decision for a current block, at least two output values according to the preset selection network model of the current block, wherein the at least two output values comprises a first value corresponding to each of at least one candidate in-loop filter network model when an in-loop filter network model is used for the current block, and a second value when the in-loop filter network model is not used for the current block;

determining, according to the at least two output values, a target in-loop filter network model when the in-loop filter network model is used for the current block, or determining according to the at least two output values that the in-loop filter network model is not used for the current block; and filtering, when the in-loop filter network model is used for the current block, the current block using the target in-loop filter network model, to obtain a first reconstructed picture block of the current block, wherein the determining, according to the at least two output values, the target in-loop filter network model when the in-loop filter network model is used for the current block, or determining according to the at least two output values that the in-loop filter network model is not used for the current block comprises:

determining a target value from the at least two output values; and in response to the target value being the first value, determining that the in-loop filter network model is used for the current block, and taking a candidate in-loop filter network model corresponding to the target value as the target in-loop filter network model; or in response to the target value being the second value, determining that the in-loop filter network model is not used for the current block.

19. The encoder of claim 17, wherein when the in-loop filter network model is used for the current block, the filtering the current block using the target in-loop filter network model, to obtain the first reconstructed picture block of the current block comprises:

determining a second reconstructed picture block of the current block; and inputting the second reconstructed picture block into the target in-loop filter network model, to obtain the first reconstructed picture block of the current block.

20. The decoder of claim 18, wherein when the in-loop filter network model is used for the current block, the filtering the current block using the target in-loop filter network model, to obtain the first reconstructed picture block of the current block comprises:

determining a second reconstructed picture block of the current block; and inputting the second reconstructed picture block into the target in-loop filter network model, to obtain the first reconstructed picture block of the current block.

* * * * *